United States Patent
Kim

(10) Patent No.: US 12,451,032 B2
(45) Date of Patent: Oct. 21, 2025

(54) DISPLAY APPARATUS

(71) Applicant: LG DISPLAY CO., LTD., Seoul (KR)

(72) Inventor: JunHyung Kim, Paju-si (KR)

(73) Assignee: LG Display Co., Ltd (KR)

( * ) Notice: Subject to any disclaimer, the term of this patent is extended or adjusted under 35 U.S.C. 154(b) by 0 days.

(21) Appl. No.: 18/753,594

(22) Filed: Jun. 25, 2024

(65) Prior Publication Data

US 2025/0061823 A1   Feb. 20, 2025

(30) Foreign Application Priority Data

Aug. 18, 2023   (KR) .................. 10-2023-0108053

(51) Int. Cl.
*G09G 5/00* (2006.01)
*G06F 1/16* (2006.01)
*G09F 9/30* (2006.01)

(52) U.S. Cl.
CPC ............ *G09F 9/301* (2013.01); *G06F 1/1652* (2013.01)

(58) Field of Classification Search
CPC ...... G09F 9/301; G06F 1/1637; G06F 1/1641; G06F 1/1652; G09G 3/035; G09G 2380/02; H10K 2102/311
See application file for complete search history.

(56) References Cited

U.S. PATENT DOCUMENTS

| | | | |
|---|---|---|---|
| 9,786,207 B2 * | 10/2017 | Kim | G09F 9/301 |
| 10,921,856 B2 * | 2/2021 | Han | G06F 1/1652 |
| 11,245,782 B2 * | 2/2022 | Hong | H04M 1/0268 |
| 11,343,927 B2 * | 5/2022 | Choi | G06F 1/1652 |
| 11,963,318 B2 * | 4/2024 | Fu | G06F 1/1652 |
| 12,069,838 B2 * | 8/2024 | Han | H05K 7/20472 |
| D1,046,854 S * | 10/2024 | Lee | D14/341 |
| 2019/0200466 A1 * | 6/2019 | Kim | G06F 1/1652 |
| 2020/0183457 A1 * | 6/2020 | Youn | G06F 1/1681 |
| 2020/0245501 A1 * | 7/2020 | Wu | F28F 3/02 |
| 2021/0389809 A1 * | 12/2021 | Choi | G06F 1/1681 |

FOREIGN PATENT DOCUMENTS

| | | |
|---|---|---|
| KR | 10-2016-0104177 A | 9/2016 |
| KR | 10-2022-0090038 A | 6/2022 |
| KR | 10-2022-0136882 A | 10/2022 |

* cited by examiner

*Primary Examiner* — Joe H Cheng

(74) *Attorney, Agent, or Firm* — Fish & Richardson P.C.

(57) ABSTRACT

A display apparatus includes a display panel and at least one plate under the display panel. The at least one plate includes a folding axis defined at the middle portion of the plate, a variable area including the folding axis and a non-variable area disposed at both sides of the variable area. The variable area includes a first area including the folding axis, a first link area disposed at both sides of the first area, and a second area disposed at both sides of the first area with the first link area therebetween. The non-variable area includes a second link area connected to the second area and a third area connected to the second link area. The at least one plate includes at least one opening pattern disposed in the variable area, having a length parallel to the folding axis and a width perpendicular to the folding axis, and being spaced at a predetermined gap.

20 Claims, 15 Drawing Sheets

DISPLAY APPARATUS

CROSS-REFERENCE TO RELATED APPLICATION

This application claims the priority of the Korean Patent Application No. 10-2023-0108053 filed on Aug. 18, 2023, which is hereby incorporated by reference in its entirety.

BACKGROUND

Field of the Disclosure

The present disclosure relates to a display apparatus.

Description of the Background

As the information society develops, demands on the display devices are also progressing in various products. Accordingly, in recent years, various flat panel display apparatus such as liquid crystal displays (LCDs), organic light emitting displays (OLEDs), micro-LED displays and so on have been developed.

In addition, a foldable display or rollable display having advantages of a flexible display panel which can be bent or folded may have the merits of being able to provide a large screen display while maintaining portability. For these reasons, it is in the spotlight as a next-generation technology in the display apparatus field. For example, flexible display apparatus may be applied to portable electronic devices such as mobile communication terminals, electronic notebooks, e-books, PMP (Portable Multimedia Player), navigation system, UMPC (Ultra-Mobile PC), mobile phones, smart phones, tablet PCs (Personal Computers), and so on. Further, it may be applied to various fields such as television set, monitors and automobile dashboards.

SUMMARY

The present disclosure, as for solving the problems described above, is to provide a display apparatus including a structure in which image quality distortion does not occur in a deformable area (i.e., folding area) when the display apparatus is unfolded.

The present disclosure is also to provide a display apparatus that can prevent an aperture pattern from being observed in the bendable area (i.e., folding area) and non-bendable area of the display apparatus.

Further, the present disclosure is to provide a display apparatus that can improve the visibility of the boundaries within each region of the foldable area (or rollable area) and non-foldable area of the display apparatus.

The present disclosure is not limited to the mentioned above, and other features not mentioned will be clearly understood by those skilled in the related art from the description below.

A display apparatus according to an example of the present disclosure may comprises a display panel and at least one plate disposed at the lower portion of the display panel. The at least one plate according to an aspect may include a folding axis setting at a central portion of the plate, a deformable area having the folding axis and non-deformable areas at each side of the deformable area. The deformable area may include a first area including the folding axis, first link areas disposed at both sides of the first area, and second areas disposed at side of each of the first link areas. The non-deformable area may include a second link area connected to the second area, and a third area connected to the second link area. At least one plate may be disposed at the deformable area, and includes a plurality of aperture patterns having a length parallel to the folding axis and width perpendicular to the folding axis, wherein the aperture patterns are separated with predetermined interval (or gap). Various specific features of other aspects may be included in the detailed description and drawings.

An aspect of the present disclosure may provide a display apparatus that may reduce image quality distortion by arranging the intervals between aperture patterns of the display apparatus including the deformable area gradually decreasing.

Another aspect of the present disclosure may provide a display apparatus with long lifetime and low power consumption by arranging the aperture patterns at different intervals in the deformable and non-deformable areas of the display apparatus.

Effects of the present disclosure may be not limited to the effects mentioned above, and other effects not mentioned will be clearly understood by those skilled in the related art from the descriptions below.

Since the contents of the present disclosure described in the problem to be solved, the means for solving the problem and the effect described above do not specify the essential features of the claim, the scope of the claim is not limited by the matters described in the content of the present disclosure.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure.

In the drawings.

DETAILED DESCRIPTION

Figure 1:
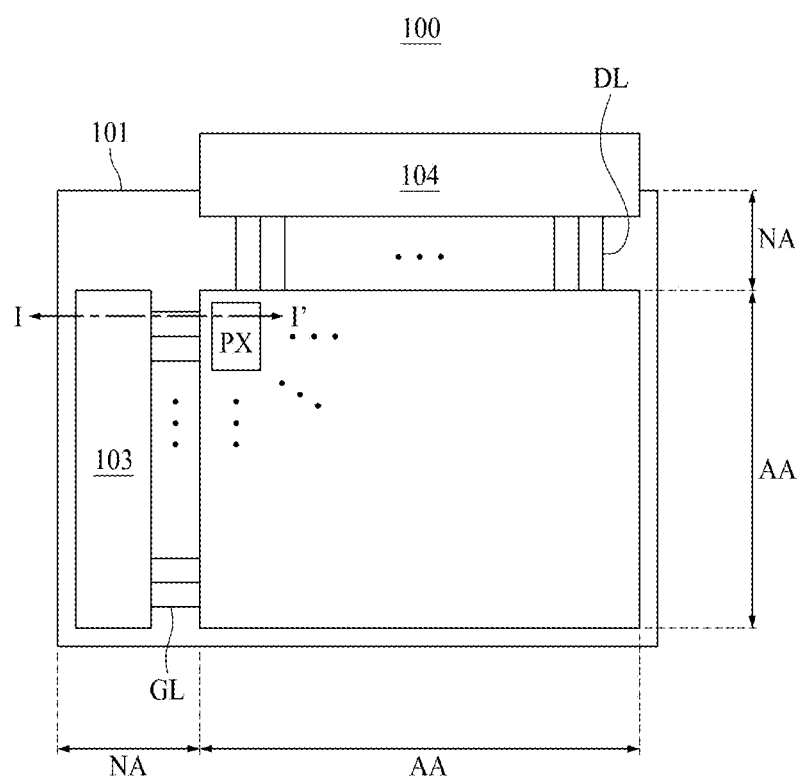
FIG. 1 is a diagram illustrating a display panel according to an aspect of the present disclosure.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these example aspects are provided so that this disclosure may be sufficiently thorough and complete to assist those skilled in the art to fully understand the scope of the present disclosure. Further, the protected scope of the present disclosure is defined by claims and their equivalents.

The shapes, sizes, ratios, angles, numbers, and the like, which are illustrated in the drawings to describe various example aspects of the present disclosure, are merely given by way of example. Therefore, the present disclosure is not limited to the illustrated details. Like reference numerals refer to like elements throughout the specification unless otherwise specified. In the following description, where the detailed description of the relevant known function or configuration may unnecessarily obscure an important point of the present disclosure, a detailed description of such known function of configuration may be omitted. In the present specification, where the terms "comprise," "have," "include," and the like are used, one or more other elements may be added unless the term, such as "only," is used. An element described in the singular form is intended to include a plurality of elements, and vice versa, unless the context clearly indicates otherwise.

In construing an element, the element is construed as including an error or tolerance range even where no explicit description of such an error or tolerance range is provided.

In the description of the various aspects of the present disclosure, where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third layer or element may be interposed therebetween. Also, if a first element is described as positioned "on" a second element, it does not necessarily mean that the first element is positioned above the second element in the figure. The upper part and the lower part of an object concerned may be changed depending on the orientation of the object. Consequently, where a first element is described as positioned "on" a second element, the first element may be positioned "below" the second element or "above" the second element in the figure or in an actual configuration, depending on the orientation of the object.

In describing a temporal relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," and the like may be used herein to describe various elements, these elements should not be limited by these terms as they are not used to define a particular order. These terms are used only to distinguish one element from another. For example, a first element could be termed a second element, and, similarly, a second element could be termed a first element, without departing from the scope of the present disclosure.

In describing various elements in the present disclosure, terms such as first, second, A, B, (a), and (b) may be used. These terms are used merely to distinguish one element from another, and not to define a particular nature, order, sequence, or number of the elements. Where an element is described as being "linked", "coupled," or "connected" to another element, that element may be directly or indirectly connected to that other element unless otherwise specified. It is to be understood that additional element or elements may be "interposed" between the two elements that are described as "linked," "connected," or "coupled" to each other.

It should be understood that the term "at least one" should be understood as including any and all combinations of one or more of the associated listed items. For example, the meaning of "at least one of a first element, a second element, and a third element" encompasses the combination of all three listed elements, combinations of any two of the three elements, as well as each individual element, the first element, the second element, and the third element.

In the present disclosure, a "display apparatus" may comprise a display device such as a liquid crystal module (LCM), an organic light emitting display module (OLED Module) and a quantum dot module (QDM) which include a display panel and a driving element for driving the display panel. In addition, the "display apparatus" may comprise an equipment display apparatus including a notebook computer, a television set, a computer monitor, automotive display apparatus or other display apparatus for vehicle which are complete products or final products having LCM, OLED module or QDM, and a set electronic apparatus or a set device (or a set apparatus) such as a mobile electronic apparatus including a smart phone or an electric pad.

Accordingly, the display apparatus in the present disclosure may include a display device itself in the narrow scope such as an LCM, an OLED module and a QDM, and a set apparatus that is an application product or end-user apparatus including the LCM, an OLED module and a QDM.

In some cases, and LCM, OLED module and QDM including a display panel and a driver element may be expressed as a 'display device' in the narrow scope, and an electronic apparatus as a finished product including the LCM, OLED module and QDM may be referred to as a 'display apparatus' which may be expressed as a 'set apparatus'. For example, a display device in the narrow scope may include a display panel of liquid crystal, OLED or quantum dot, and a source PCB which is a control unit for driving the display panel. The set apparatus may further include a set PCB which is a set control unit for controlling the entire set apparatus.

The display panel used in aspects of the present disclosure may be any type of the display panel such as a liquid crystal display panel, an organic light emitting diode (OLED) display panel, a quantum dot (QD) display panel and an electroluminescent display panel. The display panel according to aspects of the present disclosure is not limited to a specific display panel with a bendable bezel using a flexible substrate for an organic light emitting display (OLED) display panel and a backplate support structure at the bottom of the flexible substrate. In addition, the shape or size of the display panel for the display apparatus according to the present disclosure is not limited to the aspects described below.

For example, for the case that the display panel is an organic light emitting diode (OLED) display panel, it may include a plurality of gate lines and data lines, pixels formed in the crossing area of the gate lines and data lines. Further, the display panel may be configured to include an array layer including a thin film transistor which is an element for selectively applying electric voltage to each pixel, a light emitting element layer on the array layer, and an encapsulation substrate or encapsulation layer disposed on the array layer to cover the light emitting element layer. The encapsulation layer protects the thin film transistors and the light emitting element layer from external shock and may prevent moisture or oxygen from penetrating into the light emitting element layer. The layer formed on the array layer may include an inorganic light emitting layer, for example, a nano-sized material layer or quantum dots.

Features of various aspects of the present disclosure may be partially or overall coupled to or combined with each other, and may be variously inter-operated with each other and driven technically as those skilled in the art may sufficiently understand. The aspects of the present disclosure may be carried out independently from each other, or may be carried out together in a co-dependent relationship.

Hereinafter, referring to the attached figures, the present disclosure will be explained. Since a scale of each of elements shown in the accompanying drawings may be different from an actual scale for convenience of description, the present disclosure is not limited to the scale shown in the drawings.

FIG. 1 is a diagram illustrating a display panel according to an aspect of the present disclosure.

A display apparatus according to an aspect of the present disclosure may include a display panel 100. The display panel 100 may include a display area AA disposed on a substrate 101, and a non-display area NA disposed around the display area AA on the substrate 101.

The substrate 101 may be made of a plastic material with flexibility to enable to be bent. For example, the substrate 101 may be made of a material such as P I(polyimide), PET (polyethylene terephthalate), PEN (polyethylene naphthalate), PC (polycarbonate), PES (polyethersulfone), PAR (polyarylate), PSF (polysulfone), and COC (cyclio-olefin copolymer), but the aspects of the present disclosure are not limited thereto. For example, the substrate 101 may be made of glass. For another example of the present disclosure, the substrate 101 may be made of a semiconductor material such as silicon wafer.

The display area AA may be an area in which a plurality of subpixels PX are disposed for displaying video images. Each of the plurality of subpixels PX may be an individual unit for emitting light. Each of the plurality of subpixels PX may include a light emitting element and a driving circuit for the light emitting element. For example, each of subpixels PX may include a displaying element representing video images and a circuit element for driving the display element. For the case that the display apparatus is an organic light emitting display, the display element may include an organic light emitting element. For the case that the display apparatus is a liquid crystal display, the display element may include a liquid crystal element. A plurality of subpixels PX may include a red subpixel, a green subpixel, a blue subpixel and/or a white subpixel, but the aspects of the present disclosure are not limited thereto.

The non-display area NA may be an area where no video image is displayed. The non-display area NA may be an area where various lines and driver ICs for driving a plurality of subpixels PX arranged in the display area AA are disposed. For example, the non-display area NA may include at least one of a data driver 104 and a gate driver 103, but the aspects of the present disclosure are not limited thereto.

The non-display area NA may surround the display area AA. For example, the non-display area NA may be disposed at outer neighboring location of the display area AA. For example, the non-display area NA may be an extended area from the display area AA. The non-display area NA may be an area where no subpixel PX is disposed, but the aspects of the present disclosure are not limited thereto.

The non-display area NA in which an image is not displayed may further include a bezel, but the aspects of the present disclosure are not limited thereto.

The display area AA may include a plurality of data lines DL and a plurality of gate lines GL. For example, the plurality of data lines DL may be arranged in rows or columns, and a plurality of gate lines GL may be arranged in columns or rows. One subpixel PX may be placed in an area formed by the crossing the data lines DL and the gate lines GL.

The subpixel PX arrayed in the display area AA may include a thin film transistor or transistor comprising semiconductor layer. For example, the thin film transistor or the transistor may include an oxide semiconductor material, but the aspects of the present disclosure are not limited thereto. For example, the thin film transistor may be one type of the transistor, it is not limited to this term.

According to an aspect of the present disclosure, the non-display area NA may include a gate driver 103 having a gate driving circuit. The gate driving circuit of the gate driver 103 may sequentially drive each pixel row in the display area AA by sequentially supplying scan signals to the plurality of the gate lines GL. For an example, one pixel row may include a group of pixels arrayed in a row connected to one gate line. The gate driving circuit may also be called as a scan driving circuit, but it is not limited to this term.

The gate driving circuit may be comprised of a thin film transistor having a polycrystalline semiconductor layer, may be comprised of a thin film transistor having an oxide semiconductor layer, or may be comprised of a thin film transistor having a pair of a polycrystalline semiconductor layer or a thin film transistor having an oxide semiconductor layer. When the same semiconductor material is used for the thin film transistors disposed in the non-display area NA and the display area AA, they may be formed simultaneously in the same process, but the aspects of the present disclosure are not limited thereto.

The gate driving circuit may include a shift register and/or a level shifter.

The gate driving circuit may be implemented in the form of a GIP (Gate In Panel) and formed directly on the substrate 101, like the display apparatus according to one aspect of the present disclosure.

The gate driver 103 including the gate driving circuit may sequentially supply the scan signals of on voltage or off voltage to the plurality of the gate lines.

The gate driver 103 according to an aspect of the present disclosure may be formed directly on the substrate 101 as a thin film transistor having a polycrystalline semiconductor material for the semiconductor layer. Otherwise, the gate driver 103 may be formed as C-MOS type thin film transistor having a polycrystalline semiconductor material as the semiconductor layer and an oxide semiconductor material as the semiconductor layer.

For example, the oxide semiconductor material may include at least one of an IGZO (InGaZnO)-based oxide semiconductor material, an IZO (InZnO)-based oxide semiconductor material, and IGZTO (InGaZnSnO)-based oxide semiconductor material, and FIZO (FeInZnO)-based oxide semiconductor material, ZnO-based oxide semiconductor material, SIZO (SiInZnO)-based oxide semiconductor material, and ZnON (Zn-OynNitride)-based oxide semiconductor material, but the aspects of the present disclosure are not limited thereto.

When a thin film transistor with an oxide semiconductor layer and a thin film transistor with a polycrystalline semiconductor layer are included, high resolution and low power consumption may be implemented as the electron mobility may be increased in the channel area.

The display apparatus according to an aspect of the present disclosure may further include a data driver 104 having a data driving circuit. When a specific gate line is activated by the gate driver 103 including the gate driver circuit, the data driving circuit may convert image date into an analog data voltage and supply it to a plurality of data lines.

The plurality of gate lines GL may include a plurality of scan line and a plurality of light emission control line. The plurality of scan line and a plurality of light emission control line may be lines that transmit different types of gate signals (scan signals and light emission control signals) to each of the gate node of different types of transistors (scan transistors and light emission control transistors).

The gate driver 103 including the gate driving circuit may include a scan driving circuit that outputs scan signals to a plurality of scan lines which are one type of gate lines GL, and a light emission driving circuit that outputs light emission control signals to a plurality of light emission control lines which are another type of gate lines GL.

The display panel 100 according to an aspect of the present disclosure may include various data lines DL connected to the data pads.

Figure 2:
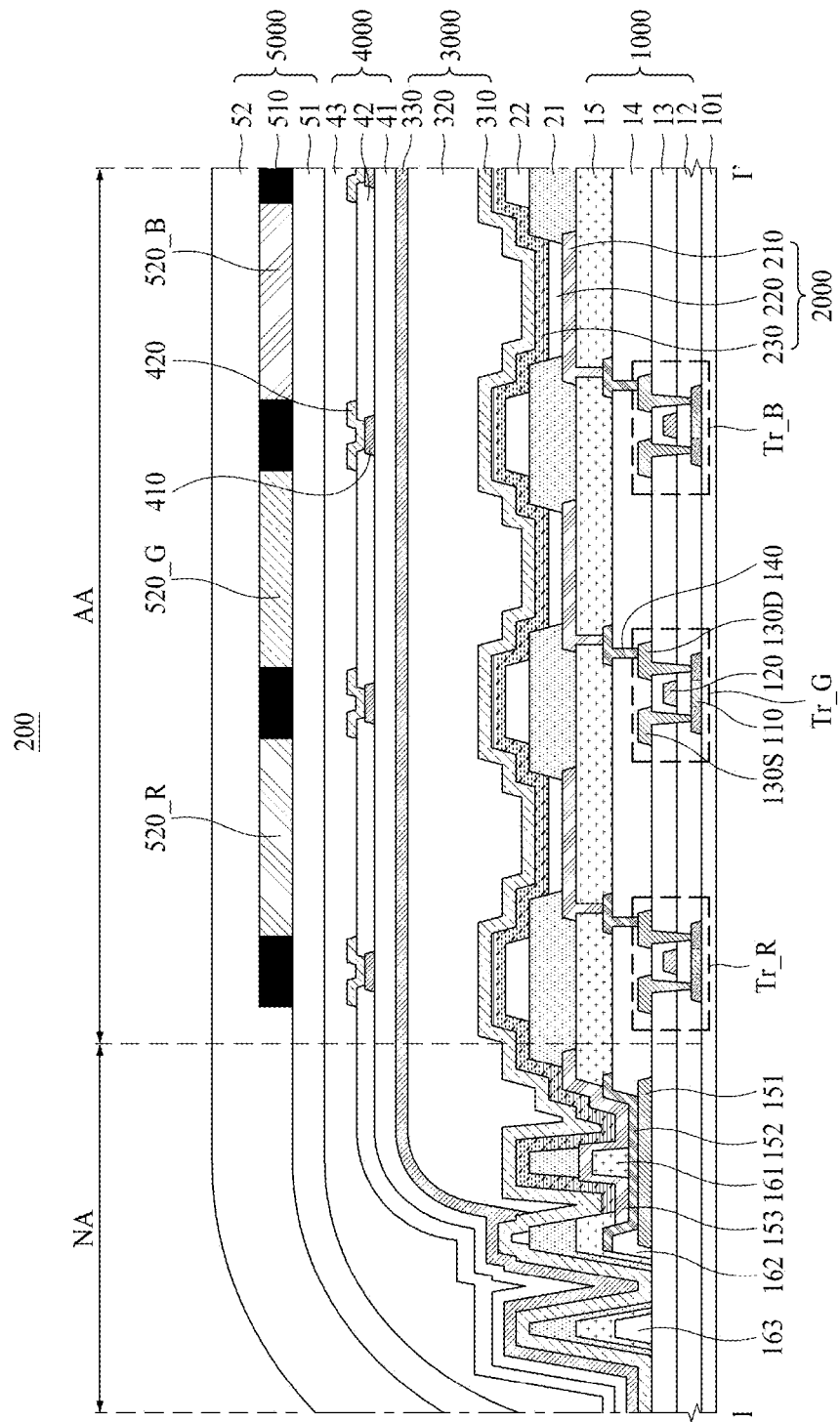
FIG. 2 is a cross-sectional view along the cutting line I-I' in FIG. 1.

FIG. 2 is a cross-sectional view along the cutting line I-I' in FIG. 1.

Referring to FIG. 2, the display apparatus according to an aspect of the present disclosure may include a display area AA and a non-display area NA. The non-display area NA may be disposed as surrounding the display area AA.

The substrate 101 may include a first substrate, a second substrate and an intermediate substrate between the first substrate and the second substrate, but the aspects of the present disclosure are not limited thereto.

For an example, the first substrate and the second substrate may be made of at least one of polyimide, polyethersulfone, polyethylene terephthalate and polycarbonate, but the aspects of the present disclosure are not limited thereto. When the substrate 101 is made of a plastic material, the manufacturing process of the display apparatus may be proceeded with a support substrate made of glass disposed below the substrate 101. After the manufacturing process of the display apparatus is completed, the support substrate may be released. In addition, after the support substrate is released, a back plate (or plate) for supporting the substrate 101 may be attached under the substrate 101. When the substrate 101 is made of a plastic material, moisture may penetrate the substrate and proceed to the light emitting element layer of the transistor unit or light emitting unit, thereby deteriorating the performance of the display apparatus. The display apparatus according to an aspect of the present disclosure may include two substrates, a first substrate and a second substrate made of a plastic material to prevent the performance of the display apparatus from being deteriorated due to moisture penetration. In addition, by forming an inorganic intermediate layer (or substrate) between the first and second substrates, moisture may be prevented from being penetrating into the substrate, to improve the reliability of the display apparatus. The intermediate layer may be made of an inorganic layer. For an example, the intermediate layer may be made of a single layer of silicon nitride ($SiN_x$) or silicon oxide ($SiO_x$) or multiple layers thereof, but the aspects of the present disclosure are not limited thereto. For example, the substrate may have a multilayer structure in which a first polyimide layer, an inorganic layer and a second polyimide layer are sequentially stacked.

The display apparatus may include a plurality of areas on the substrate 101. In the present disclosure, the display apparatus may include the display area AA and a non-display area NA, but the aspects of the present disclosure are not limited thereto.

In another aspect, the display panel 100 may include a substrate 101, a transistor part 1000, a light emission part 2000, an encapsulation part 3000, a touch part 4000, and/or a color filter part 5000.

The transistor part 1000, the light emission part 2000, the encapsulation part 3000, the touch part 4000 and the color filter part 5000 may be disposed on the substrate, but the aspects of the present disclosure are not limited thereto.

A buffer layer (or first buffer layer) may be disposed at one surface of the display area AA and the non-display area NA on the substrate 101. The buffer layer may be a single layer including silicon nitride material or silicon oxide material or a multiple layer including silicon nitride layer and silicon oxide layer. The buffer layer may improve the adhesion between the layers deposited on the buffer layer and the substrate 101 and block various types of defects such as alkaline components leaking from the substrate 101. The buffer layer may delay the diffusion of moisture or oxygen that may have been penetrated into the substrate 101. The buffer layer may be omitted based on the type and material of the substrate, and/or the structure and type of the thin film transistor.

The transistor part 1000 may be disposed on the substrate 101 and/or the buffer layer in the display area AA and the non-display area NA. The transistors in the display area AA may include a switching transistor and a driving transistor for driving the subpixel. The transistors in the non-display area NA may include a gate driver, for example, a transistor of GIP or a light emission transistor.

Referring to FIG. 2, a first driving transistor Tr_R, a second driving transistor Tr_G and a third driving transistor Tr_B are disposed in the red subpixel, green subpixel and blue subpixel, respectively.

Each of the first driving transistor Tr_R, the second driving transistor Tr_G and the third driving transistor Tr_B may include a semiconductor layer 110, a gate electrode 120, a source electrode 130S and a drain electrode 130D on the substrate 101 and/or buffer layer. The semiconductor layer 110 may include low temperature poly silicon (LTPS) or metal oxide material. For an example, the metal oxide material may include at least one of IGZO (Indium-gallium-zinc-oxide), IZO (Indium-zinc-oxide), IGTO (Indium-gallium-tin-oxide), and IGO (Indium-gallium-oxide), but the aspects of the present disclosure are not limited thereto.

The LTPS semiconductor layer may include a channel region, and a source region connected to the source electrode and a drain region connected to the drain electrode formed by electron injection (or doping) process.

The metal oxide semiconductor may have improved conductivity characteristics by a doping process that injects impurities, and may include a channel region in which a channel is formed in which electrons or holes move.

A first insulating layer 12 may be deposited on the semiconductor layer 110. The first insulating layer 12 may be disposed between the semiconductor layer 110 and the gate electrode 120 so that the semiconductor layer 110 may be insulated from the gate electrode 120. The first insulating layer 12 may be a gate insulating layer, but the aspects of the present disclosure are not limited thereto.

The first insulating layer 12 may be made of an inorganic material such as silicon nitride ($SiN_x$) or silicon oxide ($SiO_x$), but the aspects of the present disclosure are not limited thereto. For another example, the first insulating layer 12 may be made of an inorganic insulating material.

The gate electrode 120 may be disposed as overlapping with the semiconductor layer 110. The gate electrode 120 may include single layer or multiple layer which is made of at least one of silver (Ag), molybdenum (Mo), copper (Cu), titanium (Ti), aluminum (Al), chromium (Cr), nickel (Ni), neodymium (Nd), and tungsten (W), and gold (Au) or alloy thereof, but the aspects of the present disclosure are not limited thereto.

A second insulating layer 13 may be deposited on the gate electrode 120. The second insulating layer 13 may be an intermediate insulating layer, but the aspects of the present disclosure are not limited thereto.

The second insulating layer 13 may be made of an inorganic insulating material such as silicon nitride ($SiN_x$) or silicon oxide ($SiO_x$), but the aspects of the present disclosure are not limited thereto. For example, the second insulating layer 13 may be made of an organic insulating material.

The source electrode 130S and the drain electrode 130D may be disposed on the second insulating layer 13. The source electrode 130S and the drain electrode 130D may be connected to the semiconductor layer 110.

The source electrode 130S and the drain electrode 130D may be formed in the same manufacturing process. The source electrode 130S and the drain electrode 130D may be made of at least one of silver (Ag), molybdenum (Mo), copper (Cu), titanium (Ti), aluminum (Al), chromium (Cr), nickel (Ni), neodymium (Nd), and tungsten (W), and gold (Au), but the aspects of the present disclosure are not limited thereto. For another example, the source electrode 130S and the drain electrode 130D may include at least two layers having a first layer containing titanium (Ti), and a second layer containing at least one of molybdenum (Mo), copper (Cu), aluminum (Al), silver (Ag), chromium (Cr), gold (Au), neodymium (Nd) and nickel (Ni), but the aspects of the present disclosure are not limited thereto.

When forming the source electrode 130S and the drain electrode 130D, a first line 151 may be formed at the non-display area NA using the same manufacturing process. For another example, the first line 151 may be formed in a different process from the source electrode 130S and the drain electrode 130D.

The first line 151 may supply the low potential voltage EVSS output from a flexible printed circuit board (FPCB) to the cathode electrode 230.

A first passivation layer 14 may be disposed on some portions of the source electrode 130S, the drain electrode 130D and the first line 151. The first passivation layer 14 may be a first planarization layer, but the aspects of the present disclosure are not limited thereto.

The first passivation layer 14 may be made of an inorganic insulating layer such as silicon nitride ($SiN_x$) and silicon oxide ($SiO_x$) or an organic insulating layer such as polyacrylate and polyimide, but the aspects of the present disclosure are not limited thereto.

A connection electrode 140 may be disposed on the first passivation layer 14. The connection electrode 140 may be connected to the drain electrode via a contact hole formed at the first passivation layer 14. An anode electrode 210 may be connected to the connection electrode 140. So, the connection electrode 140 may electrically connect the drain electrode 130D to the anode electrode 210.

The connection electrode 140 may be made of at least one of silver (Ag), molybdenum (Mo), copper (Cu), titanium (Ti), aluminum (Al), chromium (Cr), nickel (Ni), neodymium (Nd), and tungsten (W), and gold (Au), but the aspects of the present disclosure are not limited thereto. For another example, the connection electrode 140 may include at least two layers having a first layer containing titanium (Ti), and a second layer containing at least one of molybdenum (Mo), copper (Cu), aluminum (Al), silver (Ag), chromium (Cr), gold (Au), neodymium (Nd) and nickel (Ni), but the aspects of the present disclosure are not limited thereto.

A second line 152 may be disposed at the non-display area NA by the same manufacturing process for the connection electrode 140. The second line 152 may be connected to the first line 151, so it may be used as an auxiliary electrode for supplying a ground voltage to the cathode electrode 230.

A second passivation layer 15 may be formed on some portions of the connection electrode 140 and the second line 152. The second passivation layer 15 may be a second planarization layer, but the aspects of the present disclosure are not limited thereto.

As the second passivation layer 15 may be made of an organic insulating material, the level different due to the lines and contact holes formed under the second passivation layer 15 may be compensated (i.e., reduced). For example, the organic insulating material may include polyacrylate and polyimide, but the aspects of the present disclosure are not limited thereto.

The light emission part 2000 may be disposed on the transistor part 1000. For example, the light emission part 2000 may be disposed on the second passivation layer 15 at the display area AA. The light emission part 2000 may include an anode electrode 210, an emission element layer 220 and a cathode electrode 230.

The anode electrode 210 may be electrically connected to the drain electrode 130D of the driving transistor via the connection electrode 140. The anode electrode may be made of at least one of silver (Ag), aluminum (Al), gold (Au), molybdenum (Mo), tungsten (W), chromium (Cr), lead (Pd), indium-tin-oxide (ITO), and indium-zinc-oxide (IZO), or an alloy thereof, but the aspects of the present disclosure are not limited thereto.

At the non-display area NA, a third line 153 may be disposed in a same manufacturing process for the anode electrode 210. For another example, the third line 153 may be made of different manufacturing process from that of the anode electrode 210.

The third line 153 may be connected to the second line 152 and the first line 151, and may be an auxiliary electrode for supplying the ground voltage to the cathode electrode 230, but the aspects of the present disclosure are not limited thereto. For another example, any one of the second line 152 and the third line 153 may be not formed.

A bank 21 may be disposed on some portions of the anode electrode 210 and the third line 153.

The bank 21 may distinguish or separate a plurality of subpixels from each other, minimize light blurring, and prevent color mixing that may occur at various viewing angles. The bank 21 may expose portions of the anode electrode 210 corresponding to the emission area, and my overlap with the circumferential portions of the anode electrode 210. The bank 21 may overlap with the contact hole formed at the second insulating layer 13 and the first passivation layer 14, and the contact hole formed at the second passivation layer 15.

The bank 21 may be made of at least one of an inorganic insulating material such as silicon nitride ($SiN_x$) or silicon oxide ($SiO_x$), and an organic insulating material such as BCB (benxocyclobutene), acryl resin, epoxy resin, phenolic resin, polyamide resin and polyimide resin, but the aspects of the present disclosure are not limited thereto.

A spacer 22 may be further disposed on the bank 21. The spacer 22 may minimize damages to the display apparatus from external impact by buffering the empty space between the substrate 101 on which the emission element layer 220 is formed and the upper substrate. The spacer 22 may be made of a same material as the bank 21, and may be formed simultaneously with the bank 21, but the aspects of the present disclosure are not limited thereto.

The emission element layer 220 may be disposed on the aperture area of the bank 21 exposing the anode electrode 210. The emission element layer 220 may include at least one of a red light emitting layer, a green light emitting layer, a blue light emitting layer and a white light emitting layer for generating a specific color light, but the aspects of the present disclosure are not limited thereto.

When the emission element layer 220 includes the white light emitting layer, the emission element layer 220 may be deposited on the entire of the substrate including the aperture area of the bank 21.

The cathode electrode 230 may be deposited on the emission element layer 220. The cathode electrode 230 may be the element for supplying electrons to the emission element layer 220. For example, the cathode electrode 230 may be made of a conductive material having low work function, but the aspects of the present disclosure are not limited thereto.

For the case of the top emission type, the cathode electrode 230 may include a transparent conductive material for transmitting the light. For example, the cathode electrode 230 may be made of at least one of indium-tin-oxide (ITO) and indium-zinc-oxide (IZO), but the aspects of the present disclosure are not limited thereto.

For another example, the cathode electrode 230 may be made of a semi-transparent conductive material half-transmitting the light. For example, the cathode electrode 230 may include at least one of alloys such as LiF/Al, CsF/Al, Mg:Ag, Ca/Ag, Ca:Ag, LiF/Mg:Ag, LiF/Ca/Ag, and LiF/Ca:Ag, but the aspects of the present disclosure are not limited thereto.

For the case of the bottom emission type, the cathode electrode 230 may be a reflective electrode which may be made of an opaque conductive material for reflecting the light. For example, the cathode electrode 230 may include one of silver (Ag), aluminum (Al), gold (Au), molybdenum (Mo), tungsten (W) and chromium (Cr), or an alloy thereof, but the aspects of the present disclosure are not limited thereto.

The emission element layer 220 may further include hole injection layer, hole transport layer, electron transport layer and electron injection layer in addition to the light emitting layer, but the aspects of the present disclosure are not limited thereto.

For example, the emission element layer 220 may be formed by stacking a hole supporting layer, a light emitting layer, and an electrode supporting layer on the anode electrode 210 in that order or in the reverse order. For example, the hole supporting layer may be a layer for injecting or transporting holes to the light emitting layer. For example, the hole supporting layer may be hole injection layer, hole transport layer or electron blocking layer, but the aspects of the present disclosure are not limited thereto. The electron supporting layer may be a layer for injecting or transporting electrons to the light emitting layer. For example, the electron supporting layer may be an electron injection layer, electron transport layer or hole blocking layer, but the aspects of the present disclosure are not limited thereto.

The emission element layer 220 may include at least one of light emitting layer. Each light emitting layer may include a red-light emitting layer generating red light, a green-light emitting layer generating green light and a blue-light emitting layer generating blue light for each subpixel PXL.

The emission element layer 220 may include at least two light emitting units. The light emitting unit may be expressed as a stack, but it is not limited to the term. At least two light emitting units may include a first light emitting unit and a second light emitting unit. The first light emitting unit and the second light emitting unit may include a red-light emitting layer generating red light, a green-light emitting layer generating green light, and a blue-light emitting layer generating blue light, for each subpixel. At least two light emitting layers included in the first light emitting unit and the second light emitting unit may be light emitting layers that emit the same color light. For another example, the first light emitting layer included in the first light emitting unit may be a blue light emitting layer, a sky blue light emitting layer, a dark blue light emitting layer, a blue light emitting layer with a red light emitting layer, a sky blue light emitting layer with a red light emitting layer, and a dark blue light emitting layer with a red light emitting layer, but the aspects of the present disclosure are not limited thereto. For example, the second light emitting layer included in the second light emitting unit may be a yellow light emitting layer, a yellow-green light emitting layer, a green light emitting layer, a yellow light emitting layer with a red light emitting layer, a yellow-green light emitting layer with a red light emitting layer, a green light emitting layer with a red light emitting layer, a combination of a yellow, a yellow-green and a green light emitting layers, a combination of a yellow, a yellow-green, a green and a red light emitting layers, a combination of two yellow-green and one green light emitting layers, a combination of one yellow-green and two green light emitting layers, a combination of two yellow-green, a green and a red light emitting layers, and a combination of one yellow-green, two green and a red light emitting layers, but the aspects of the present disclosure are not limited thereto. A charge generation layer may be disposed between the first light emitting unit and the second light emitting unit. The charge generation layer may include n-type charge generation layer and p-type charge generation layer. Each of the first light emitting unit and the second light emitting unit may include at least one of hole injection layer, hole transport layer, hole blocking layer, electron blocking layer, electron transport layer and electron injection layer, but the aspects of the present disclosure are not limited thereto.

The at least two light emitting unit may include a first light emitting unit, a second light emitting unit and a third light emitting unit. The first light emitting layer included in the first light emitting unit may be the same as described above. The second light emitting layer included in the second light emitting unit may be the same as described above. The third light emitting layer included in the third light emitting unit may be the same as the first emitting layer, but the aspects of the present disclosure are not limited thereto. A first charge generation layer may be disposed between the first light emitting unit and the second light emitting unit. The first charge generation layer may include n-type charge generation layer and p-type charge generation layer. A second charge generation layer may be disposed between the second light emitting unit and the third light emitting unit. The second charge generation layer may include n-type charge generation layer and p-type charge generation layer. Each of the first light emitting unit, the second light emitting unit and the third light emitting unit may include at least one of hole injection layer, hole transport layer, hole blocking layer, electron blocking layer, electron transport layer and electron injection layer, but the aspects of the present disclosure are not limited thereto.

At least two light emitting unit may include a first light emitting unit, a second light emitting unit, a third light emitting unit and a fourth light emitting unit. At least two light emitting layers among the first light emitting unit, the second light emitting unit, the third light emitting unit and the fourth light emitting unit may include light emitting layers which emit the same color light. For example, at least two light emitting layers among the first light emitting unit, the second light emitting unit, the third light emitting unit and the fourth light emitting unit may include blue light emitting layer, but the aspects of the present disclosure are not limited thereto. At least one light emitting layer among the first light emitting unit, the second light emitting unit, the third light emitting unit and the fourth light emitting unit may include the blue light emitting layer and another light emitting layer. For example, at least one light emitting layer among the first light emitting unit, the second light emitting unit, the third light emitting unit and the fourth light emitting unit may be a yellow light emitting layer, a yellow-green light emitting layer, a green light emitting layer, a yellow light emitting layer with a red light emitting layer, a yellow-green light emitting layer with a red light emitting layer, a green light emitting layer with a red light emitting layer, a combination of a yellow, a yellow-green and a green light emitting layers, a combination of a yellow, a yellow-green, a green and a red light emitting layers, a combination of two yellow-green and one green light emitting layers, a combination of one yellow-green and two green light emitting layers, a combination of two yellow-green, a green and a red light emitting layers, and a combination of one yellow-green, two green and a red light emitting layers, but the aspects of the present disclosure are not limited thereto. A charge generation layer may be disposed between the first light emitting unit and the second light emitting unit. The charge generation layer may include n-type charge generation layer and p-type charge generation layer. Each of the first light emitting unit and the second light emitting unit may include at least one of hole injection layer, hole transport layer, hole blocking layer, electron blocking layer, electron transport layer and electron injection layer, but the aspects of the present disclosure are not limited thereto. A first charge generation layer may be disposed between the first light emitting unit and the second light emitting unit. The first charge generation layer may include n-type charge generation layer and p-type charge generation layer. A second charge generation layer may be disposed between the second light emitting unit and the third light emitting unit. The second charge generation layer may include n-type charge generation layer and p-type charge generation layer. A third charge generation layer may be disposed between the third light emitting unit and the fourth light emitting unit. The third charge generation layer may include n-type charge generation layer and p-type charge generation layer. Each of the first light emitting unit, the second light emitting unit, the third light emitting unit and the fourth light emitting unit may include at least one of hole injection layer, hole transport layer, hole blocking layer, electron blocking layer, electron transport layer and electron injection layer, but the aspects of the present disclosure are not limited thereto.

An end portion including a driving circuit part and a dam part where a plurality of dams are disposed may be disposed in the non-display area NA of the display apparatus. The end portion of the non-display area NA may be an area of a connection part where the cathode electrode 230 and the low potential line are electrically connected, and may be an area where the display apparatus is sealed by an encapsulation layer and a plurality of dams. At the end portion, the first insulating layer 12, the second insulating layer 13, the first passivation layer 14 and the second passivation layer 15 may be extended and disposed on the substrate 101.

Lines may be disposed at the end portion so that the power voltage and touch signals are applied from the FPCB of the display apparatus to the driving element through the lines.

A plurality of dams may be disposed at the end portion of the non-display area NA. To prevent a second encapsulation layer 320, which is formed of an organic layer among the plurality of encapsulation layers, from leaking to the outside, the dams may be formed by stacking one or more insulating layers, but the aspects of the present disclosure are not limited thereto.

The plurality of dams may include at least two dams, for example, a first dam 161, a second dam 162 and a third dam 163, but the numbers of dams are not limited thereto. Each of the first dam 161, the second dam 162 and the third dam 163 may surround the display area AA.

Each of the first dam 161, the second dam 162 and the third dam 163 may have a first height, a second height and a third height, respectively. For example, the second height may be higher than the first height, and the third height may be lower than the second height.

Even though the second encapsulation layer 320 may overflow the first dam 161, due to the second dam 162, the second encapsulation layer 320 may be prevent from leaking to the outside.

Each of the first dam 161, the second dam 162 and the third dam 163 may include the first passivation layer 14, the second passivation layer 15, the bank 21 and the spacer 22.

The first line 151 may be disposed under the second passivation layer 15 of the first dam 161 and the first passivation layer 14 of the second dam 162. The second line 152 may be disposed between the second passivation layer 15 and the bank 21 of the first dam 161 and the second dam 162. The third line 153 may be disposed on the bank 21 of the first dam 161.

The first line 151, the second line 152 and the third line 153 may be electrically connected by contacting each other at the areas of the first dam 161 and the second dam 162 to transmit a voltage to the cathode electrode 230.

The first line 151, the second line 152 and the third line 153 may be disposed as overlapped with some portions of the gate driver of the driving circuit part. For example, the gate driver may be formed in a gate-in-panel (GIP) type, but the aspects of the present disclosure are not limited thereto.

A capping layer may be disposed on the cathode electrode 230. The capping layer may protect the cathode electrode 230 and improve the light extraction efficiency. For example, the capping layer may be formed of an organic material or an inorganic material. For example, the capping layer may be made of a metal material such as LIF (lithium fluoride), which is an inorganic material, and further include an organic material, but the aspects of the present disclosure are not limited thereto.

The encapsulation part 3000 may be disposed on the light emission part 2000. For example, the encapsulation part 3000 may be disposed on the cathode electrode 230 and the capping layer. The encapsulation part 3000 may protect the display apparatus from external moisture, oxygen or foreign substances. For example, the encapsulation part 3000 prevents oxygen and moisture from penetrating from the outside, thereby preventing oxidation of the light emitting material and electrode material.

The encapsulation part 3000 may be made of a transparent material so that the light emitted from the emission element layer 220 may be transmitted.

The encapsulation part 3000 may include a first encapsulation layer 310, a second encapsulation layer 320 and a third encapsulation layer 330, but the aspects of the present disclosure are not limited thereto. The first encapsulation layer 310, the second encapsulation layer 320 and the third encapsulation layer 330 may be sequentially stacked, but the aspects of the present disclosure are not limited thereto.

The first encapsulation layer 310 and the third encapsulation layer 330 may be made of at least one material of silicon nitride ($SiN_x$), silicon oxide ($SiO_x$) or aluminum oxide ($Al_yO_z$), but the aspects of the present disclosure are not limited thereto.

The second encapsulation layer 320 may cover a foreign material or particles that may occur during the manufacturing process. The second encapsulation layer 320 may flatten surface condition after depositing the first encapsulation layer 310.

The second encapsulation layer 320 may be made of an organic material, for example, such as silicon oxycarbon ($SiOC_z$), epoxy, polyimide and polyethlenene or polymer of acrylate series, but the aspects of the present disclosure are not limited thereto.

The touch part 4000 for sensing touch operation to the display apparatus 200 may be disposed on the third encapsulation layer 330.

The touch part 4000 may be disposed between the encapsulation part 3000 and the color filter part 5000. For example, the touch part 4000 may include a buffer layer 41 (or a second buffer layer) disposed on the third encapsulation layer 330. The buffer layer 41 may improve the adhesion between the layers formed on the buffer layer 41 and the third encapsulation layer 330. The buffer layer 41 may extend to the area where the connection area between the flexible PCB (FPCB) disposed in the non-display area NA and the substrate 101 is disposed. The buffer layer 41 may be made of a single layer of silicon nitride ($SiN_x$) or silicon oxide $SiO_x$) or multiple layers thereof, but the aspects of the present disclosure are not limited thereto.

A bridge electrode 410 may be disposed on the buffer layer 41. The bridge electrode 410 may connect the touch electrodes 420 and transmit the touch signals. The bridge electrode 410 may be made of a single layer or multiple layers including silver (Ag), molybdenum (Mo), copper (Cu), titanium (Ti), aluminum (Al), chromium (Cr), nickel (Ni), neodymium (Nd), and tungsten (W), and gold (Au) or alloy thereof, but the aspects of the present disclosure are not limited thereto.

A third insulating layer 42 may be disposed on the bridge electrode 410. The touch electrodes 420 separately disposed on the third insulating layer 42 may be connected to the bridge electrode 410 via contact holes formed at the third insulating layer 42. For example, the third insulating layer 42 may be an insulating layer disposed at the touch part 4000 so it may be a layer insulating touch signal, but the aspects of the present disclosure are not limited thereto. For example, the third insulating layer 42 may be made of single layer or multiple layer including silicon nitride ($SiN_x$) or silicon oxide ($SiO_x$), but the aspects of the present disclosure are not limited thereto.

A touch electrode 420 may be disposed on the third insulating layer 42. By connecting to the plurality of touch lines disposed at the non-display area NA, the touch electrode 420 may be connected to the touch circuit disposed in the flexible PCB (FPCB).

The touch circuit may supply a touch driving signal to the touch electrode 420 to drive a touch operation, detect a touch sensing signal from the touch electrode 420, and determine the touch event and/or touch location (coordinates) based on the touch sensing signal.

The touch electrode 420 may be made of a single layer or multiple layers including silver (Ag), molybdenum (Mo), copper (Cu), titanium (Ti), aluminum (Al), chromium (Cr), nickel (Ni), neodymium (Nd), and tungsten (W), and gold (Au) or alloy thereof, but the aspects of the present disclosure are not limited thereto. For example, the touch electrode 420 and the bridge electrode 410 may be disposed at the positions corresponding to the bank 21 and the spacer 22.

A third passivation layer 43 and a fourth passivation layer 51 may be disposed on the touch electrode 420.

The third passivation layer 43 and the fourth passivation layer 51 may be extended to the area where the connection part between the flexible PCB (FPCB) disposed at the non-display area NA and the substrate 101 is disposed.

The third passivation layer 43 and the fourth passivation layer 51 may be made of an inorganic insulating material such as silicon nitride ($SiN_x$) or silicon oxide ($SiO_x$), or an organic insulating material such as BCB (BenzoCycloButene), acryl resin, epoxy resin, phenolic resin polyamide resin and polyimide resin, but the aspects of the present disclosure are not limited thereto.

The color filters 520_R, 520_G and 520_B, and black matrix 510 may be disposed on the fourth passivation layer 51. For example, the color filters 520_R, 520_G and 520_B, and the black matrix 510 may be disposed as corresponding to the subpixel.

A display apparatus according to aspects of the present disclosure may include the color filter part 5000 on the touch part 4000 instead of an optical control layer. For example, the optical control layer may be a polarization film. The polarization film may prevent light entering from outside the display panel from being reflected by the cathode electrode 230 between the subpixels PX, thereby it may improve the visibility of the display apparatus. However, as passing through the polarization film, the brightness of the light may be decreased by about 50%, so that the light efficiency may be reduced or degraded. To enhance the brightness of the light provided from the display apparatus, more electric current for driving the light emitting element should be applied to the light emitting unit 2000, so it may result in an increase in power consumption. To solve this problem, for example, the color filter part 5000 may be disposed instead of the polarization film. As a result, the power consumption may be reduced and a display apparatus with a thin thickness may be provided. According to another aspect of the present disclosure, a polarization film may be disposed in place of the color filter part 5000, but it is not limited thereto.

Figure 3A:
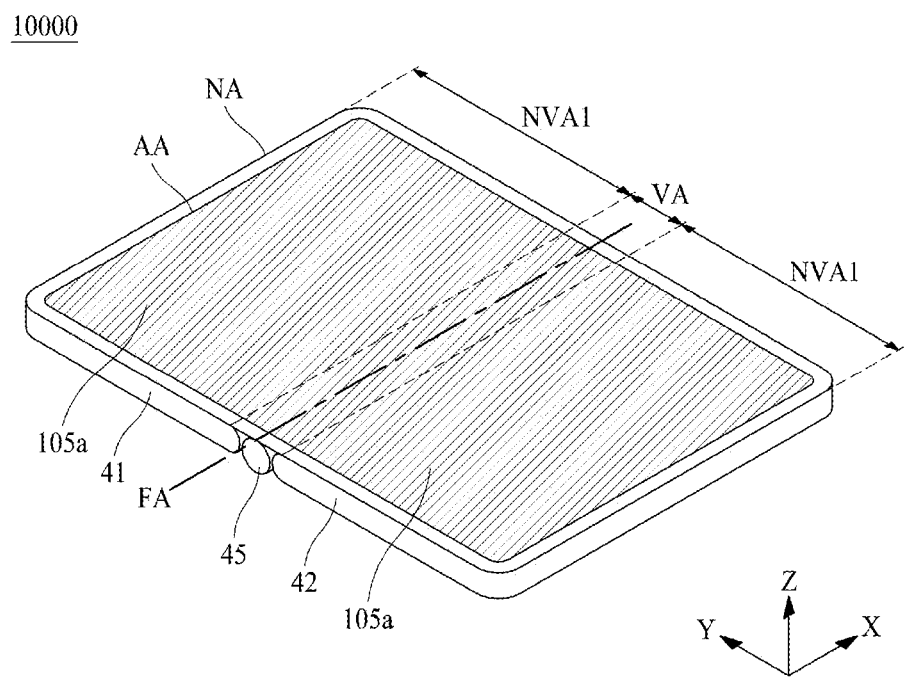
FIGS. 3A to 3C are perspective views illustrating display apparatus according to an aspect of the present disclosure.
Figure 3B:
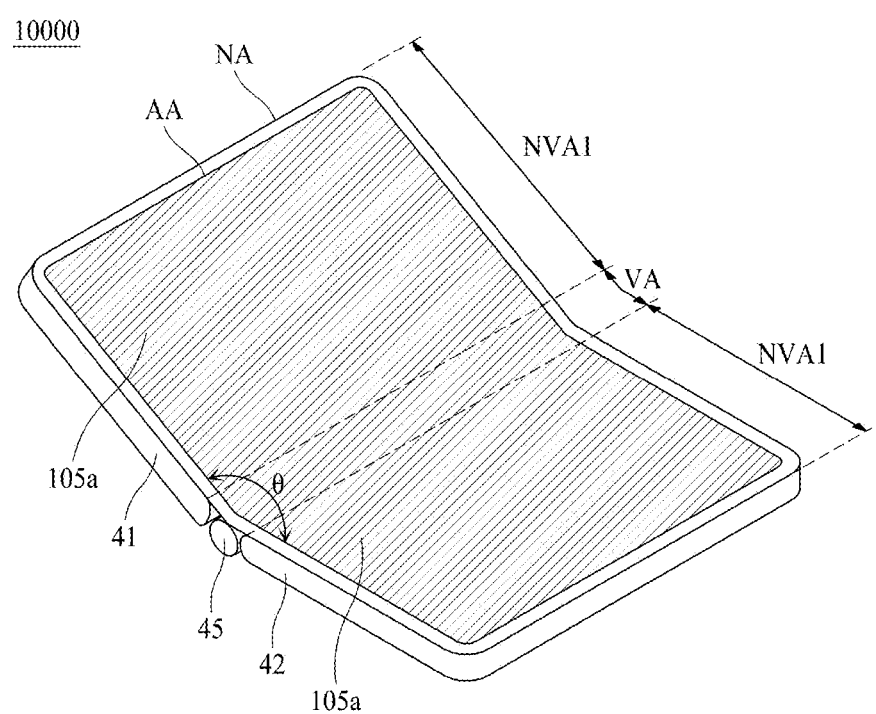
Figure 3C:
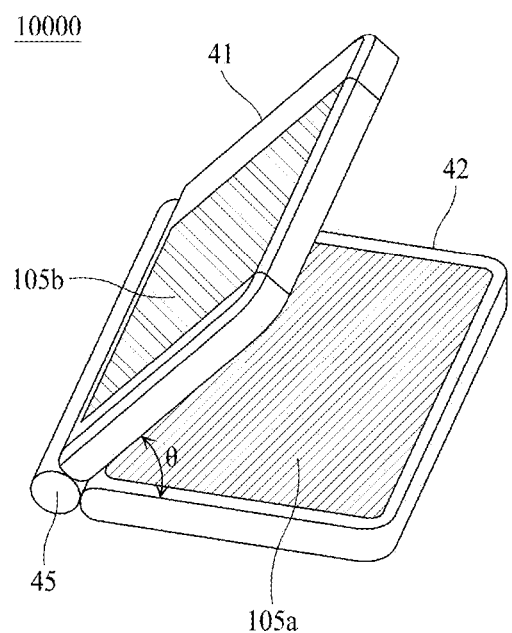

FIGS. 3A to 3C are perspective views illustrating display apparatus according to an aspect of the present disclosure.

Referring to FIGS. 3A to 3C, a display apparatus 10000 according to an aspect of the present disclosure may comprise a display area AA, and a non-display area NA.

The display area AA may be an area for representing video images. The non-display area NA may be disposed around the display area AA, and may be an area not displaying the video image.

The display apparatus 10000 may include a variable area VA and a non-variable area NVA1 depending on whether the shape may be changed or varied. For example, the term of 'variable' may include terms of 'folding', 'bending' or 'flexible', but the aspects of the present disclosure are not limited thereto. For example, 'variable' may include the structure from the fully folded state to the bent state at the level of a few nanometers. For example, the display apparatus 10000 may include a variable area VA and a non-variable area NVA1 depending on the state of folding or bending. The display apparatus 10000 may include a foldable display apparatus, a bendable display apparatus, a curved display apparatus, variable display apparatus or flexible display apparatus, but the aspects of the present disclosure are not limited thereto. Here, the display apparatus 1000 is explained with the case of a folding display apparatus, but the aspects of the present disclosure are not limited thereto.

The variable area VA may be an area which is bent when the display apparatus 10000 is folded. For example, the variable area VA may be a folding area. For example, the variable area VA may be folded according to a specific radius of curvature relative to a folding axis FA. For example, the folding axis FA of the variable area VA may be defined along the X-axis, the non-variable area NVA1 may be extended from the variable area VA in the Y-axis direction perpendicular to the folding axis FA. When the variable area VA is folded with respect to the folding axis FA, the variable area VA may form a portion of circular or elliptical shape. The radius curvature of the variable area VA may be a radius of the circle or ellipse formed by the variable area VA, but the aspects of the present disclosure are not limited thereto.

The non-variable area NVA1 may be the area which is not folded as the display apparatus 10000 is folded. For example, as folding the display apparatus 10000, the non-variable area NVA1 may maintain the flat state. The non-variable area NVA1 may be disposed at both sides of the variable area VA, but the aspects of the present disclosure are not limited thereto. For example, the non-variable area NVA1 may be an area expanded to Y-axis direction from the variable area VA with respect to the folding axis FA. For this case, the variable area VA may be disposed between two non-variable areas NVA1. For example, as the display apparatus 1000 is folding with respect to the folding axis FA, the non-display areas NVA1 may be overlapped with each other. For example, the non-variable area NVA1 may be overlapped with some portions of the display area AA and some portions of the non-display area NA.

For example, when the upper surface of the display apparatus 10000 on which an image is displayed is referred to as the display surface, and the lower surface of the display apparatus 10000 which is the opposite side of the display surface is referred to as a back surface, the variable area VA may be folded in one of following two ways; one is an outer folding type in which the display surface of the display apparatus 10000 is folded to be exposed to the outside, and the other is an inner folding type in which the display surface of the display apparatus 10000 is folded to face each other, but the aspects of the present disclosure are not limited thereto.

For example, the variable area VA may be an area which is bent to a predetermined curvature when the display apparatus 10000 is folded in at least one type of the inner folding type and the outer folding type. Areas other than the non-variable area NVA1 may be the variable area VA.

The display apparatus 10000 may further include a hinge structure for folding the display panel and a case for supporting and storing the display panel. The variable area VA and the non-variable area NVA1 may be applied to other elements of the display apparatus 10000 with the same way.

Referring to FIGS. 3A to 3C, the display apparatus 10000 may include a first housing 41 and a second housing 42. The first housing 41 and the second housing 42 may be rotatably coupled by a connecting member 45. For example, a hinge may be formed at the side of the first housing 41. The connecting member 45 may be disposed at the side of the second housing 42. The hinge formed on the side of the first housing 41 may be rotatably connected to the connecting member 45 disposed on the side of the second housing 42. The connecting member 45 may include the hinge, but the aspects of the present disclosure are not limited thereto. For another example, the connecting member 45 may be formed integrally with the first housing 41 or the second housing 42.

Referring to FIG. 3A, it may have an unfolded state in which the upper surface of the first housing 41 and the upper surface of the second housing 42 may be positioned on one plane with respect to the connection member 45. FIG. 3A illustrates the inner folding type. Under the fully unfolded state as shown in FIG. 3A, the display surface 105*a* may form one flat plane covering the upper surface of the first housing 41 and the upper surface of the second housing 42. Referring to FIG. 3B illustrating a method of folding, the display surface 105*a* of the display apparatus 10000 may be starting to be folded in half and two surface parts of the display surface 105*a* are facing each other. For example, it may have an unfolded state in which the first housing 41 and the second housing 42 are tilted with a predetermined angle θ. Referring to FIG. 3C, the first housing 41 and the second housing 42 may be folded with respect to the connecting member 45 as facing each other with a predetermined angle θ. The angle θ between the first housing 41 and the second housing 42 may be a right angle, an obtuse angle or an acute angle, but the aspects of the present disclosure are not limited thereto.

When display apparatus 10000 is folded, the display surface 105*a* corresponding to the display area AA disposed on the upper surfaces of the first housing 41 and the second housing 42 may be closed on the inner side and hidden from the outside. For example, the display apparatus 10000 may inactivate the display area AA corresponding to the display surface 105*a* when the display apparatus 10000 is folded. Activation (or activate) may means displaying a video image on the screen corresponding to the display area AA. Alternatively, the activation may mean that the display apparatus 10000 changes from a sleep state to an active state. The display area AA corresponding to edge of the first housing 41 and the edge of the second housing 42 may be inactivated. The inactivation (or inactivate) may means turning off the screen corresponding to the display area AA. Alternatively, the inactivation may means not supplying power to the subpixel of pixel corresponding to the display area AA where the screen is to be displayed. Otherwise, the inactivation may mean that the display apparatus 10000 goes from an active state to a sleep state.

According to another aspect of the present disclosure, as shown in FIG. 3C, a rear display surface 105b corresponding to the upper surface of the first housing 41 in the display area AA may be disposed on the lower surface of the first housing 41. A rear display area may be disposed on the rear display surface 105b. For this case, in the folded state of the display apparatus 10000, the rear display surface 105b corresponding to the rear display area may be exposed to the outside. For example, in the folded state, the display apparatus 10000 may activate the rear display area corresponding to the rear display surface 105b. In the unfolded state, the display surface 105a and/or the rear display surface 105b may be activated. The display surface 105a and the rear display surface 105b may be linked to display the same images, but the aspects of the present disclosure are not limited thereto.

Figure 4:
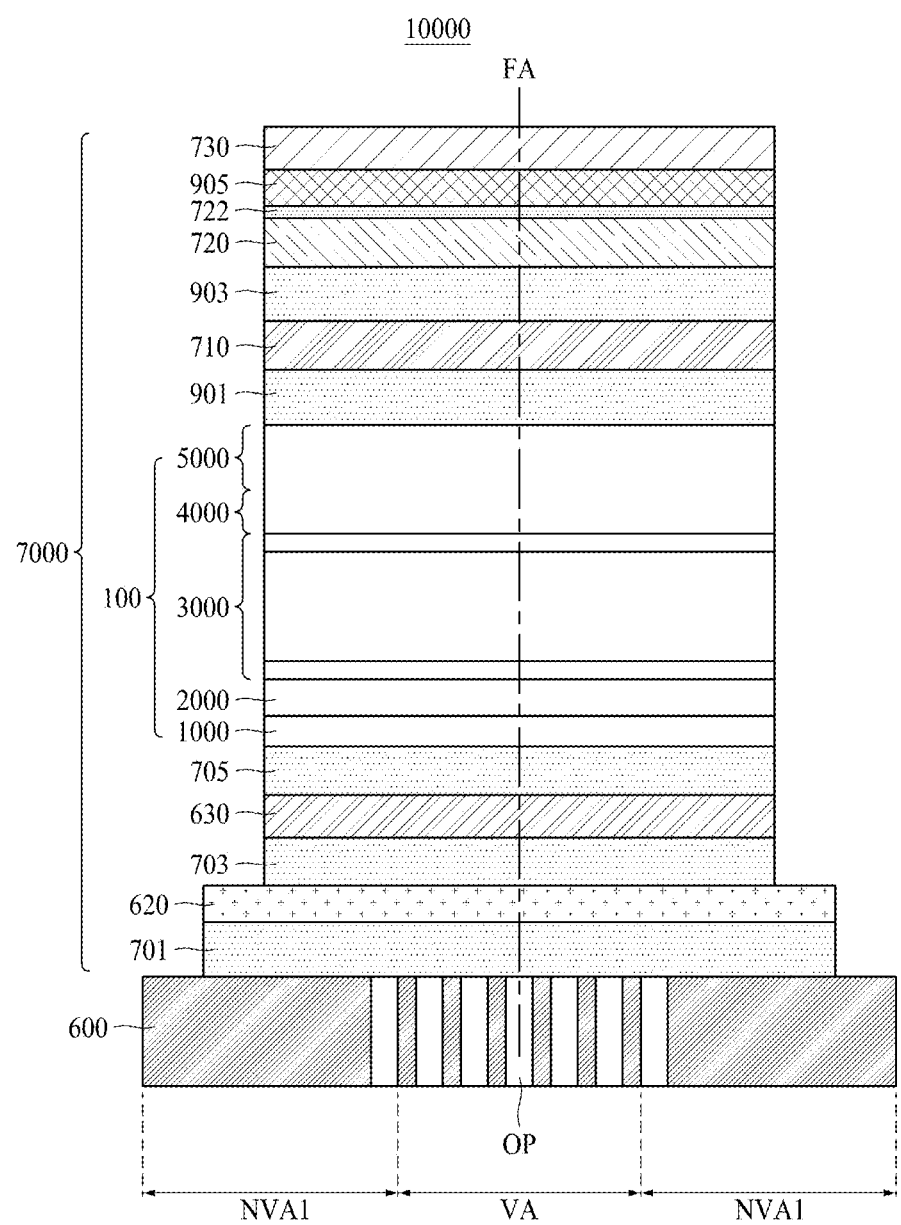
FIG. 4 is a cross-sectional view illustrating a display apparatus according to an aspect of the present disclosure.

FIG. 4 is a cross-sectional view illustrating a display apparatus according to an aspect of the present disclosure.

Referring to FIGS. 2 to 4, a display apparatus 10000 according to an aspect of the present disclosure may include a display panel 100. The display panel 100 according to the aspects of the present disclosure may include a transistor part 1000, a light emission part 2000, an encapsulation part 3000, a touch part 4000, and/or a color filter part 5000.

The transistor part 1000 may be disposed on the substrate 101. The light emission part 2000 may be disposed on the transistor part 1000. The encapsulation part 3000 may be disposed on the light emission part 2000. The touch part 4000 and the color filter part 5000 may be disposed on the encapsulation part 3000. Since the explanations for the transistor part 1000, the light emission part 2000, the encapsulation part 3000, the touch part 4000 and the color filter part 5000 are substantially the same as that described in FIG. 2, this description may be omitted or simplified. The display panel 100 may include the transistor part 1000, the light emission part 2000, the encapsulation part 3000, the touch part 4000 and the color filter part 5000, but the aspects of the present disclosure are not limited thereto. In addition, a cover layer 52 may be further disposed on the color filter part 5000 for protecting the whole elements there-under.

The display panel 100 having flexibility may have difficulty maintaining its shape in a constant form when folding or bending the display apparatus 10000 and may be vulnerable to external impact and/or stimuli. Accordingly, various types of support members may be disposed on the back surface of the display panel or the transistor part 1000. For example, at least one plate may be disposed under the display panel 100 or the transistor part 1000. For example, a first plate 600, a second plate 620, and a third plate 630 may be disposed under the display panel 100 or the transistor part 1000, but the aspects of the present disclosure are not limited thereto. For example, the transistor part 1000 may be formed on at least one plate.

When applying the substrate 101 made of flexible plastic, the thickness of the substrate 101 may be very thin, so the display panel 101 may sag when folded or bent. To prevent the display panel from sagging, the third plate 630 may be disposed on the rear surface of the display panel 100 or the transistor part 1000. For example, the third plate 630 may be a back plate or a supporting plate, but it is not limited these terms.

The first plate 600 may strengthen the rigidity of the substrate 101 and the second plate 620, which are formed of plastic material. For example, the first plate 600 may be made of a metal material having excellent thermal conductivity. For example, the first plate 600 may be made of a metal material such as stainless steel (SUS), carbon fiber reinforced plastics (CFRP), invar, aluminum (Al) and magnesium (Mg), but the aspects of the present disclosure are not limited thereto. For example, as the metal materials have higher strength compared to the plastic materials, the durability of the display apparatus 10000 may be improved. According to an aspect of the present disclosure, the first plate 600 may include graphite or plastic such as polycarbonate (PC).

The first plate 600 may include at least one opening pattern (or apertures) OP. For example, at least one opening pattern OP may be disposed as corresponding to the variable area VA. At least one opening pattern OP may allow the first plate 600 of the variable area VA to be easily folded and may effectively relieve stress applied to the first plate 600 during folding action. Additionally, the folding characteristics of the display apparatus 10000 may be improved by facilitating restoration when folded and unfolded.

At least one opening pattern OP may extend in a direction parallel to the folding axis FA and may be configured in a discontinuous form. The width of each of the opening patterns OP may be shorter than the length of the first plate 600 along the folding axis FA direction. The shape and arrangement method of the opening patterns OP may be not limited to those shown in FIG. 4. The gap between the opening patterns OP adjacent to each other in the direction perpendicular to the folding axis FA may be constant, but the aspects of the present disclosure are not limited thereto. For example, each of the opening patterns OP may be configured in a specific shape, but the aspects of the present disclosure are not limited thereto. For example, the opening patterns OP may be formed in a different shape or arrayed with a different interval in the variable area VA, but the aspects of the present disclosure are not limited thereto. For example, the gap between the opening patterns OP adjacent to each other in a direction perpendicular to the folding axis FA may be wider as the distance from the folding axis FA increases. The opening patterns OP adjacent to each other in a direction perpendicular to the folding axis FA may have a first gap at the center portion near the folding axis FA, and a second gap greater than the first gap at both outside portions from the center portion. For example, each of the opening patterns OP may have an oval shape, a rectangular shape, a diamond shape, a circular shape, a slit shape and so on, but the aspects of the present disclosure are not limited thereto. In some aspects, the opening patterns OP may be disposed in the variable area VA only, but the aspects of the present disclosure are not limited thereto.

In an aspect, at least one opening pattern OP may be disposed in the variable area VA and the non-variable area NVA1, but the aspects of the present disclosure are not limited thereto.

Referring to FIGS. 3A to 3C according to an aspect of the present disclosure, the variable area VA may be disposed at the central portion of the display apparatus 10000, but the location of the variable area VA may be not limited thereto. For example, two or more variable areas VA may be defined.

The second plate 620 may be disposed on the first plate 600. For example, the second plate 620 may reinforce the rigidity of the display panel 100 and/or the transistor part 1000. The second plate 620 may be made of different material from the first plate 600. For example, the second plate 620 may be made of a polymer that blocks ultraviolet lights. For example, the second plate 620 may be made of polyethylene terephthalate (PET) in black color, but the aspects of the present disclosure are not limited thereto. The first plate 600 may refer to a lower plate, and the second plate 620 may refer to an upper plate, but these terms are not limited.

The display apparatus 10000 may further include at least one adhesive. For example, at least one adhesive may be disposed between the plates. For example, at least one adhesive may include a first adhesive 701, a second adhesive 703, and a third adhesive 705, but the aspects of the present disclosure are not limited thereto. The first adhesive 701 may be disposed between the first plate 600 and the second plate 620. The second adhesive 703 may be disposed between the second plate 620 and the third plate 630. The third adhesive 705 may be disposed between the third plate 630 and the transistor part 1000. The third adhesive 705 may be disposed between the third plate 630 and the display panel 100. For example, the first adhesive 701 may cover at least one opening pattern OP of the first plate 600. For example, the first adhesive 701, the second adhesive 703 and the third adhesive 705 may be at least one third adhesive, but the terms are not limited thereto.

The first adhesive 701, the second adhesive 703 and the third adhesive 705 may include at least one of optically cleared adhesive (OCA), pressure sensitive adhesive (PS), and optically clear resin (OCR).

In some aspects, the second plate 620 and the first adhesive 701 may have a larger width extended to left and right sides compared to the layers stacked thereon. For example, the second plate 620 may have a width from left end side to the right end side wider than that of the display panel 100.

In some aspects, the first plate 600 may have a larger width extended to left and right sides compared to the layers stacked thereon. For example, the first plate 600 may have wider width than that of the second plate 620. Referring to FIG. 4, at least one cover member may be disposed on the display panel 100. The at least one cover member may include a first cover member 710, a second cover member 720 and a third cover member 730, but the aspects of the present disclosure are not limited thereto. For example, the cover member may be a front member, a cover window or a window cover, but the aspects of the present disclosure are not limited thereto.

At least one cover member may be disposed on the display panel 100. For example, the first cover member 710 may be disposed on the color filter part 5000. The second cover member 720 may be disposed on the first cover member 710. The third cover member 730 may be disposed on the second cover member 720. For example, at least one of the first cover member 710, the second cover member 720 and the third cover member 730 may protect the display apparatus 10000 including the light emitting part 2000, from being damaged by external impact or from being deteriorated by moisture, oxygen, or foreign substances intruded from the outside.

At least one of the first cover member 710, the second cover member 720 and the third cover member 730 may be made of a material that is transparent and has excellent impact resistance and scratch resistance. For example, at least one of the first cover member 710, the second cover member 720 and the third cover member 730 may include a film which is made of polymers such as polyimide, polyamide, polyethleneterephthalate, polymethylmethacrylate, polypropylene glycol and polycarbonate, but the aspects of the present disclosure are not limited thereto. For another example, at least one of the first cover member 710, the second cover member 720 and the third cover member 730 may include a film which is made of an optically isotropic polymer such as cyclol olefin (co)polymer, optically isotropic polycarbonate, optically isotropic polymethylmethacrylate, but the aspects of the present disclosure are not limited thereto. For another example, at least one of the first cover member 710, the second cover member 720 and the third cover member 730 may include a film which is made of the chemically strengthened laminated glass.

For the case that the third cover member 730 is made of a thin glass substrate, a protective film may be disposed on the third cover member 730 to prevent scattering the glass when the third cover member 730 is damaged or broken.

The display apparatus according an aspect of the present disclosure, for example, may include a hole area. The hole area may be disposed around the display area AA. The hole area may be disposed circumferences of the substrate 101.

For example, the hole area may be disposed at some portions of the at least one plate and at least one cover member. For example, the hole area may be disposed at some portions of the at least one plate including the first plate 600, the second plate 620 and the third plate 630 and some portions of the at least one cover member including the first cover member 710, the second cover member 720 and the third cover member 730. For example, the hole area included in at least one plate of the first plate 600, the second plate 620 and the third plate 630 may be empty and transparent area. When the display apparatus 10000 shown in FIG. 4 has a hole area, it may be referred to an UDC (Under Display Camera) or HID (Hole in Display), but it is not limited these terms. For example, in the hole area, the display elements may be sparsely disposed within transparent areas, so a camera placed under the hole area may receive lights from outside. For example, at least one of camera, optical sensor and/or optical element may be disposed at the hole area, but the aspects of the present disclosure are not limited thereto. For example, the optical sensor may be an infrared sensor, but the aspects of the present disclosure are not limited thereto.

Referring to FIG. 4, at least one adhesive may be disposed in the display apparatus 10000. For example, at least one adhesive may be disposed between the cover members. For example, at least one adhesive may be disposed between the cover members in the display area AA. At least one adhesive may include a fourth adhesive 901, a fifth adhesive 903 and a sixth adhesive 905, but the aspects of the present disclosure are not limited thereto. For example, the fourth adhesive 901 may be disposed between the display panel 100 and the first cover member 701. For example, the fifth adhesive 903 may be disposed between the first cover member 710 and the second cover member 720. For example, the sixth adhesive 905 may be disposed between the second cover member 720 and the third cover member 730. The fourth adhesive 901, the fifth adhesive 903 and the sixth adhesive 905 may be at least one of the first adhesive, but it is not limited to these terms. In addition, an optical layer 722 may be further disposed on the second cover member 720, but it is not limited thereto, the optical layer 722 may be disposed on the first cover member 710 or third cover member 730.

For example, the optical layer 722 may be a layer for suppressing external light reflection.

The fourth adhesive 901, the fifth adhesive 903 and the sixth adhesive 905 may include an optically cleared adhesive (OCA), a pressure sensitive adhesive (PSA) or an optically cleared resin OCR.

Figure 5:
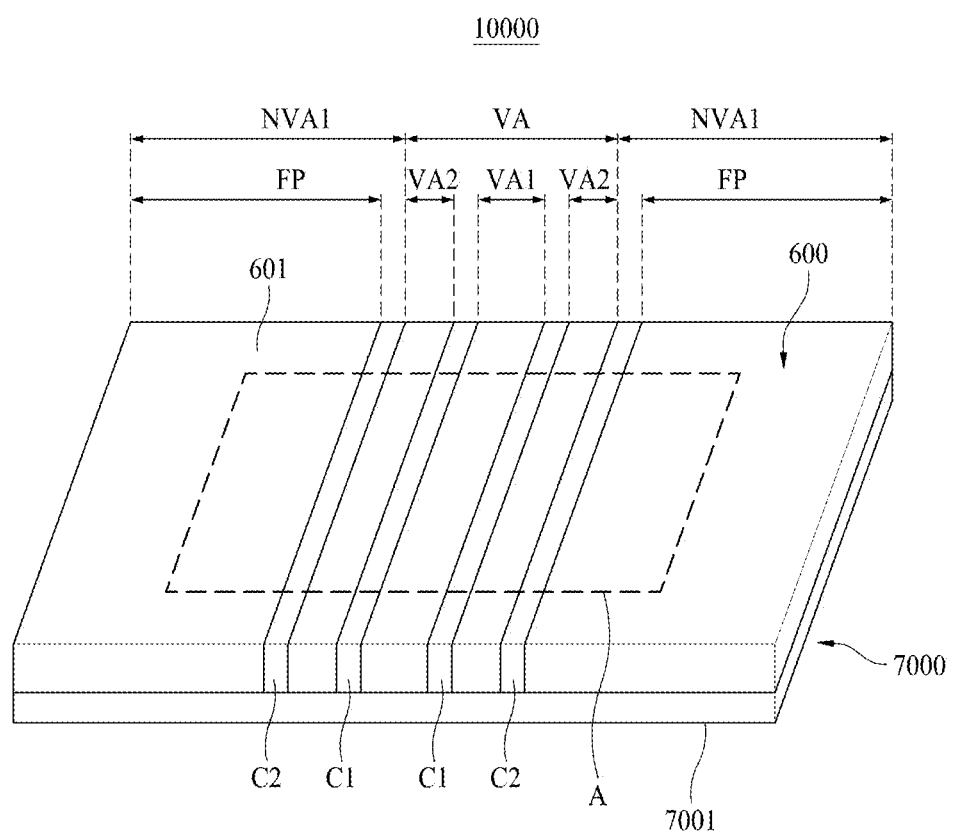
FIG. 5 is a perspective view illustrating a rear surface of the display apparatus in the unfolded state according to an aspect of the present disclosure.

FIG. 5 is a perspective view illustrating a rear surface of the display apparatus in the unfolded state according to an aspect of the present disclosure.

Figure 6:
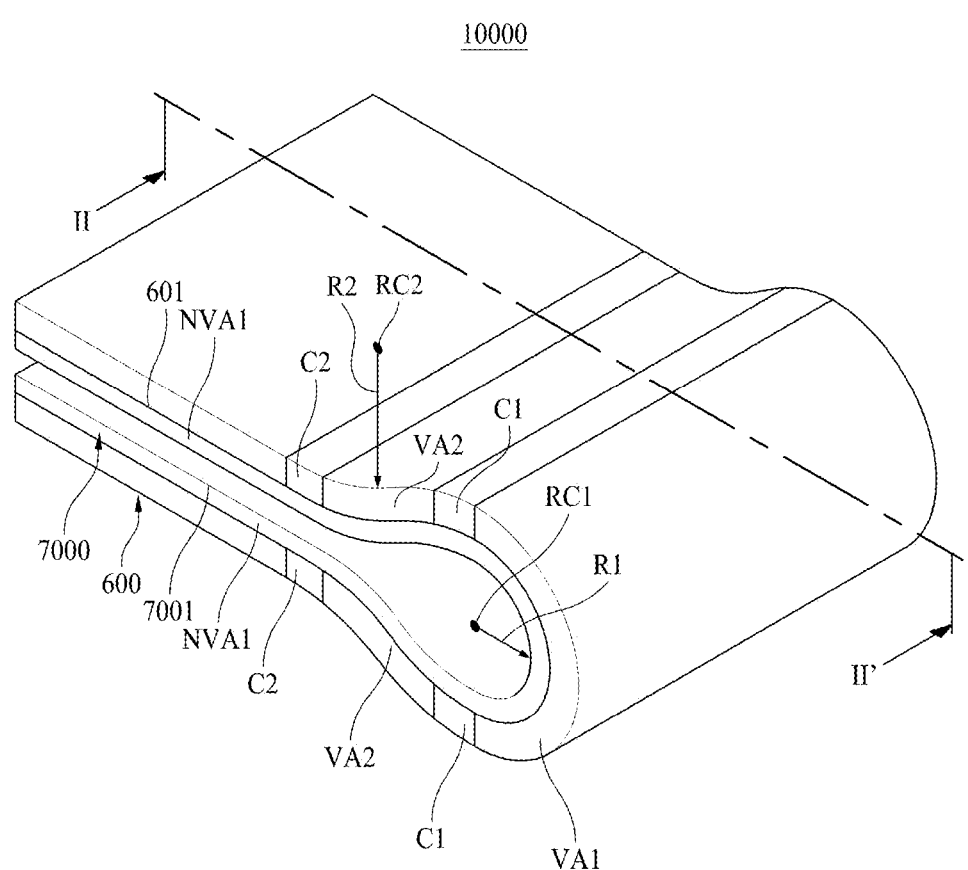
FIG. 6 is a perspective view illustrating the folded state of the display apparatus shown in FIG. 5.

FIG. 6 is a perspective view illustrating the folded state of the display apparatus shown in FIG. 5.

Figure 7:
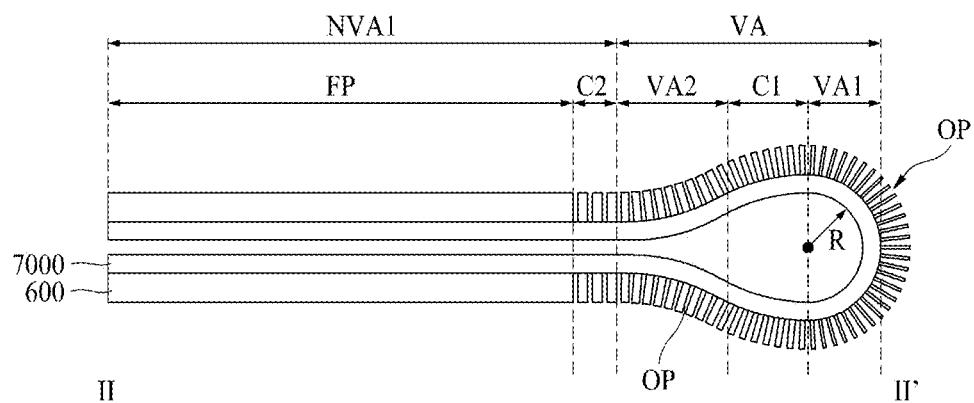
FIG. 7 is a cross-sectional view along the cutting line II-II' in FIG. 6.

FIG. 7 is a cross-sectional view along the cutting line II-II' in FIG. 6.

Referring to FIGS. 5 to 7, a display apparatus 10000 according to one aspect of the present disclosure may comprise a flexible display module 7000 and a first plate 600. Here, the display module 7000 may be a flexible display module.

The display module 7000 according to an aspect of the present disclosure may include elements from the first adhesive 701 to the third cover member 730 shown in FIG. 4, some elements may be omitted from the configuration of FIG. 4, or further elements may be added to the configuration of FIG. 4, but the aspects of the present disclosure are not limited thereto.

Referring to FIGS. 5 to 7, a first plate 600 may be disposed under the lower surface of the display module 7000. For example, the display module 7000 may have the same elements with the same configuration as shown in FIG. 4. For example, the first plate 600 may be same as the first plate 600 explained above referring to FIG. 4.

The display apparatus 10000 according to an aspect of the present disclosure may further comprise a case for containing the display module 7000 and the first plate 600, and a hinge.

The display module 7000 may include a display surface 7001 and a non-display surface 601 corresponding to the display surface 7001. The display module 7000 may provide video images to a direction of the display surface 7001. The non-display surface 601 may a surface on which no video image is provided.

The display module 7000 may include a flexible substrate made of flexible plastic materials. As a result, the display module 7000 may be freely folded or unfolded within a certain angle range.

The first plate 600 may be disposed under the display module 7000. The rigidity of the first plate 600 may be harder than that of the display module 7000, so the first plate 600 may support the display module 7000. For example, the first plate 600 may prevent deformation of the display module 7000 due to the user's touch or an external force. The first plate 600 may include nobinite, stainless steel, invar or alloy thereof. The first plate 600 according to an aspect of the present disclosure may have a thickness in range of 130 μm (micrometer) to 170 μm. For example, the first plate 600 may have a thickness of 150 μm. Referring to FIG. 4, in an aspect, in order that the first plate 600 stably supports the display module 7000, the first plate 600 may be thicker than at least any one of layers thereon. For example, the first plate 600 may be thicker than the second plate 620.

The display module 7000 may include a variable area VA and a non-variable area NVA1 in which the non-variable area NVA1 may be disposed at both sides of the variable area VA. For example, the variable area VA may include a first area VA1, a second area VA2 and a first link area C1. The second area VA2 may disposed at both sides of the first area VA1 apart from the first area VA1 with a distance corresponding to the first link area C1. The first link area C1 is disposed between the first area VA1 and the second area VA2. For example, non-variable area NVA1 may include a third area FP and a second link area C2. The third area FP may be disposed as being apart from the second area VA2 with a distance corresponding to the second link area C2. The second link area C2 may be disposed between the second area VA2 and the third area FP.

When the display module 7000 is folded, as shown in FIG. 6, the display module 7000 may have a curved surface at the first area VA1. For example, as folding the display module 7000, the display module 7000 may be bent with a first radius of curvature R1 at the first area VA1. For example, as folding the display module 7000, the center of curvature at the first area VA1 of the display module 7000 may be set at a first center of curvature RC1.

According to the aspects of the present disclosure, an inner folding structure may be formed at the first area VA1 and an outer folding structure may be formed at the second area VA2. As a result, the occurrence of wrinkles or folded line in the variable area VA may be prevented when the display apparatus is repeatedly folded and unfolded.

When the display module 7000 is folded, the display module 7000 may have a curved surface at the second area VA2. For example, as folding the display module 7000, the display module 7000 may have a second radius of curvature R2 at the second area VA2. According to the aspects of the present disclosure, the display apparatus 10000 may have at least one radius of curvature i.e., including the first radius of curvature R1 and the second radius of curvature R2. For example, the first radius of curvature R1 may be different from the second radius of curvature R2. For example, the first link area C1 may be an area for connecting the first area VA1 and the second area VA2 having different radius of curvatures. For another example, the second radius of curvature R2 may be same with the first radius of curvature R1. For example, as folding the display module 7000, the center of curvature at the second area VA2 may be set at a second center of curvature RC2. The second center of curvature RC2 may be located in the direction of the non-display surface 601 of the display module 7000.

For example, referring to FIG. 7, as folding the display apparatus 10000, the shape of the folded portion may be expressed as a water droplet structure (or shape), a tear drop structure, a jar structure, or an omega structure, but the aspects of the present disclosure are not limited thereto.

When the display module 7000 is folded, the display module 7000 and/or the first plate 600 may have a flat surface at the non-variable area NVA1.

When the display module 7000 is folded, the display module 7000 and/or the first plate 600 may have a flat surface at the second link area C2 and the third area FP. Further, when the display module 7000 is folded, the display module 7000 may have a curved surface at the second link area C2.

In an aspect, the display apparatus 10000 may include a supporting member attached under the first plate 600. The supporting member may be connected to the case and the hinge. For example, the supporting member may have relatively high rigidity compared to the other elements.

When the display apparatus 10000 is unfolded after being folded, a repulsive force may occur at the portion of the first plate 600 that is overlapped with the variable area VA having curvature. For example, when the display apparatus 10000 is unfolded after being folded, a repulsive force may occur at some portions of the first plate 600 which are overlapped with the second area VA2 and the first area VA1, respectively.

According to aspects of the present disclosure, the second radius of curvature R2 may be larger than the first radius of curvature R1. When the repulsive force occurs at the first plate 600, wrinkles may appear at the display apparatus 10000. For example, when the display apparatus 1000 is unfolded after being folded, each of the first area VA1 and the second area VA2 may have wrinkles.

In the aspects of the present disclosure, when the display module 7000 is folded, the first center of curvature RC1 may be located in the direction of the display surface 7001 of the display module 7000, and the second center of curvature RC2 may be located in the direction of the non-display surface 601 of the display module 7000.

To reduce the repulsive force of the first plate 600 and improve flexibility, at least one opening pattern OP may be formed in the first plate 600. With the opening pattern OP in the first plate 600, the flexibility of the first plate 600 may be increased so that the repulsive force may be reduced. The first plate 600 may include a plurality of opening patterns OP penetrating the first plate 600. At least one opening pattern OP may enhance the flexibility of the first plate 600. Accordingly, when the display apparatus 10000 is folded and then unfolded, wrinkles may not appear in the variable area VA, or the depth of the wrinkles may be relatively small.

To enhance the flexibility of the first plate 600, a first portion of the first plate 600 overlapped with the variable area VA may have a thickness thinner than a second portion of the first plate 600 overlapped with the non-variable area NVA1. For another aspect, a portion of the first plate 600 overlapped with the first link area C1 may have the same thickness as a portion of the first plate 600 overlapped with the non-variable area NVA1. As the thickness of the first plate 600 becomes thinner, the flexibility may increase, and the repulsive force may decrease. The rigidity of the first plate 600 may increase as the thickness increases.

Figure 8:
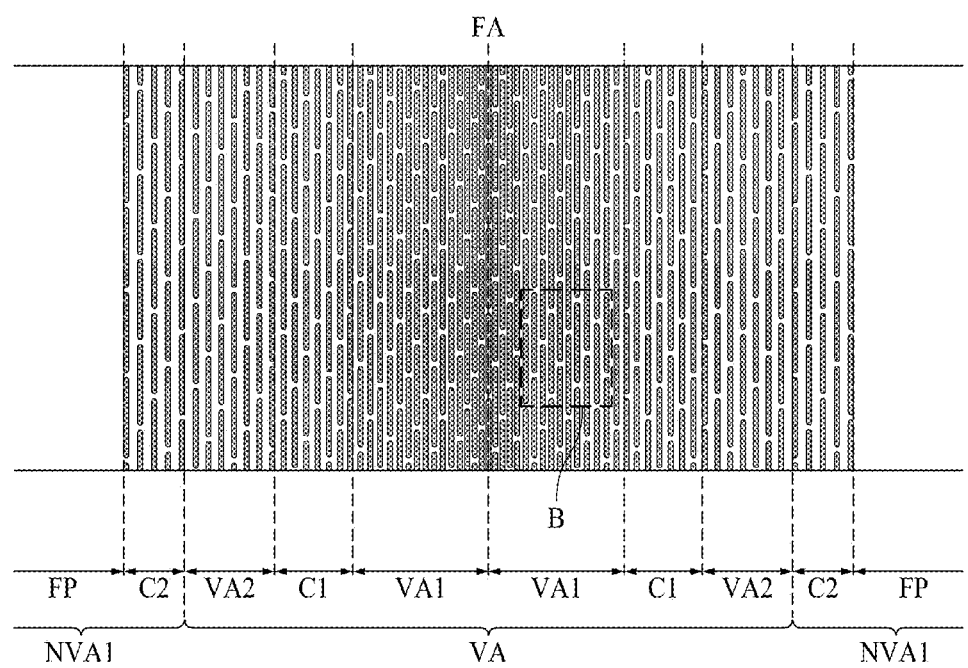
FIG. 8 is an enlarged view illustrating 'A' area of FIG. 5.

FIG. 8 is an enlarged view illustrating 'A' area of FIG. 5. FIG. 8 is an enlarged view of the area of FIG. 5, which includes at least one opening pattern OP.

Figure 9:
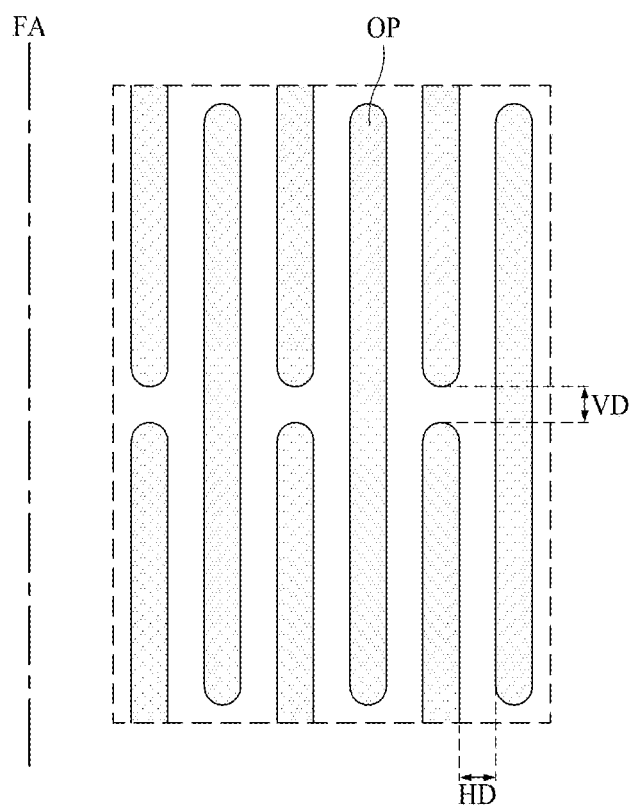
FIG. 9 is an enlarged view illustrating 'B' area of FIG. 8.

FIG. 9 is an enlarged view illustrating 'B' area of FIG. 8.

Figure 10A:
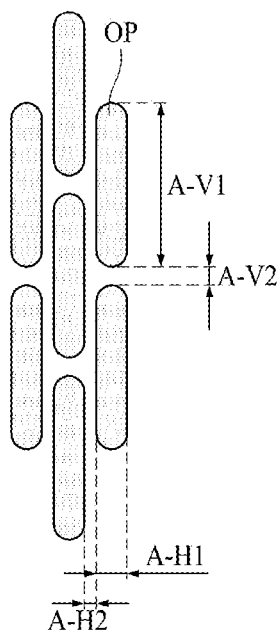
FIG. 10A is an enlarged view illustrating a first area of a plate shown in FIG. 8 according to an aspect of the present disclosure.

FIG. 10A is an enlarged view illustrating a first area of a plate shown in FIG. 8 according to an aspect of the present disclosure.

Figure 10B:
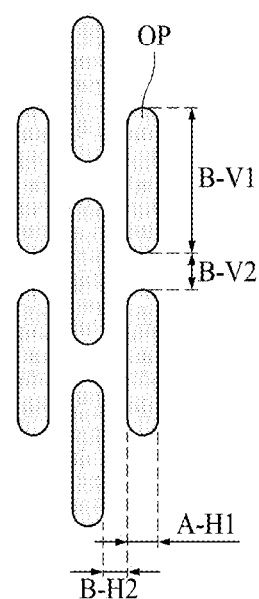
FIG. 10B is an enlarged view illustrating a first link area of a plate shown in FIG. 8 according to an aspect of the present disclosure.

FIG. 10B is an enlarged view illustrating a first link area of a plate shown in FIG. 8 according to an aspect of the present disclosure.

Figure 10C:
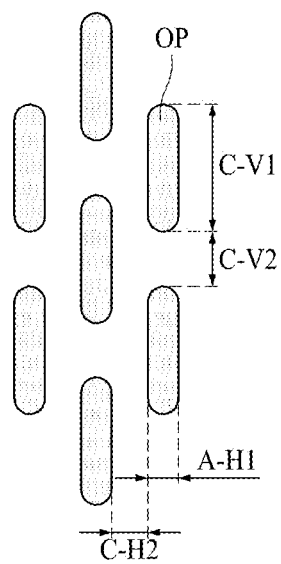
FIG. 10C is an enlarged view illustrating a second area of a plate shown in FIG. 8 according to an aspect of the present disclosure.

FIG. 10C is an enlarged view illustrating a second area of a plate shown in FIG. 8 according to an aspect of the present disclosure.

Figure 10D:
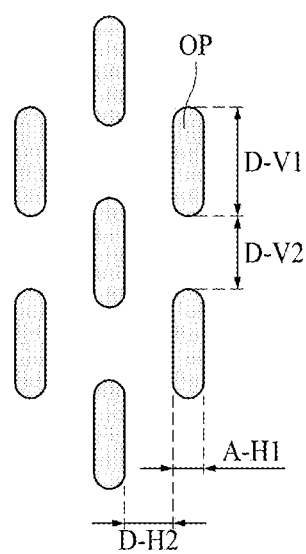
FIG. 10D is an enlarged view illustrating a second link area of a plate shown in FIG. 8 according to an aspect of the present disclosure.

FIG. 10D is an enlarged view illustrating a second link area of a plate shown in FIG. 8 according to an aspect of the present disclosure.

Referring to FIGS. 5 to 8, at least one plate, for example, the first plate 600, may include a non-variable area NVA1 and a variable area VA. At least one plate is referred to a first plate for convenience of explanation, but according to the aspects of the present disclosure, the second plate and the third plate may also have the same structure and/or characteristics as the first plate. The non-variable area NVA1 may include a display area. For example, a folding axis FA may be defined or set at the central portion of the first plate 600. For example, the folding axis FA may be included in the variable area VA. For example, the non-variable area NVA1 may be disposed at both sides of the variable area VA.

For example, the variable area VA may include a first area VA1, a first link area C1 and a second area VA2. The first area VA1 may have the folding axis FA. The first link area C1 may be disposed at both sides of the first area VA1. The second area VA2 may be disposed at both sides of the first area VA1 with the first link area C1 therebetween.

For example, the non-variable area NVA1 may include a second link area C2 and a third area FP. The second link area C2 may be connected to or expanded from the second area VA2. The third area FP may be connected to or expanded from the second link area C2. For example, the second link area C2 and/or the third area FP may maintain flat condition.

For example, the first area VA1 may have a first radius of curvature R1, and may be bent in the first direction. The second area VA2 may have a second radius of curvature R2 different from the first radius of curvature R1, and may be bent in the second direction different from the first direction.

For example, the second radius of curvature R2 may be larger than the first radius of curvature R1 (R2>R1), and the second direction may be perpendicular to the first direction.

At least one plate, for example the first plate 600, may have at least one opening pattern OP. For example, at least one opening pattern OP may be formed or included in the plate to improve the deformability, folding ability, flexibility and recovery characteristics of the first plate 600.

An opening pattern OP may have a length extended along the direction parallel to the folding axis FA. For example, an opening pattern OP may have a long axis and a short axis, and the long axis may be disposed as being parallel to the direction of the folding axis FA. An opening pattern OP may have a width along the short axis perpendicular to the folding axis FA. Two opening patterns OP may be arranged with a predetermined gap.

A plurality of opening patterns OP may be arrayed in the variable area VA and/or in the non-variable area NVA1. Each of the opening patterns OP may have a length parallel to the direction of folding axis FA and a width perpendicular to the direction of the folding axis FA. The plurality of opening patterns OP may be arrayed as being apart with a gap from each other. The aspects of the present disclosure are not limited thereto.

Some of the plurality of opening patterns OP may be filled with at least one of polyurethane (PU), thermoplastic polyurethane (TPU), polyacrylate, rubber and silicon (Si). The aspects of the present disclosure are not limited thereto.

At least one opening patterns OP may be further disposed in the second link area C2 of the non-variable area NVA1 which is the outer region of the variable area VA.

Referring to FIGS. 8 to 9, at least one opening pattern OP may be arrayed as being spaced apart with a horizontal gap HD along the direction perpendicular to the folding axis FA. At least one opening pattern OP may be arrayed as being spaced apart with a vertical gap VD along the direction of the folding axis FA.

For example, first area VA1 may be an inner folding (or positive folding) area that varies (or folds or bends) in the direction of the display surface 7001.

For example, the second area VA2 may be an outer folding (or negative folding) area that varies (or folds or bends) in the direction of the non-display surface 601.

For example, the third area FP may be a flat area.

Since the curvature or characteristics of each area may be different, there may be a need to improve border visibility. According to aspects of the present disclosure, the density per unit area of the opening patterns OP may be decreased as going from the folding axis FA to the variable area VA and from the variable area VA to the non-variable area NVA1.

Accordingly, flexibility may be ensured in the variable area VA and rigidity may be ensured in the non-variable area NVA1.

According to aspect of the present disclosure, the horizontal gap HD of the opening patterns OP may be gradually increased from the first area VA1 to the second link area C2. For example, the horizontal gap HD of the opening patterns OP may be gradually increased as it goes from the folding axis FA to the non-variable area NVA1 along the horizontal direction.

For example, the horizontal gap HD of the opening patterns OP may have a minimum value in the first area VA1.

For example, the horizontal gap HD of the opening patterns OP may have a maximum value in the second link area C2 or second area VA2.

Referring to FIGS. 8 to 10D, for example, the horizontal gap HD of the opening patterns OP may have a first horizontal gap A-H2 in the first area VA1, and a second horizontal gap B-H2 wider than the first horizontal gap A-H2 in the first link area C1.

For example, the horizontal gap HD of the opening patterns OP may have a third horizontal gap C-H2 wider than the second horizontal gap B-H2 in the second area VA2. The horizontal gap HD of the opening patterns OP may have a fourth horizontal gap D-H2 wider than the third horizontal gap C-H2 in the second link area C2.

In an aspect, the horizontal gaps A-H2, B-H2, C-H2 and D-H2 of the opening patterns OP may be same within each area. In another aspect, the horizontal gaps A-H2, B-H2, C-H2 and D-H2 of the opening patterns OP may be gradually increased as the distance from the folding axis FA increases.

For example, the first horizontal gap A-H2 of the opening patterns OP may be same within the first area VA1, or may be gradually increased as the distance from the folding axis FA increases.

For example, the second horizontal gap B-H2 of the opening patterns OP may be same within the first link area C1, or may be gradually increased as the distance from the folding axis FA increases.

For example, the third horizontal gap C-H2 of the opening patterns OP may be same within the second area VA2, or may be gradually increased as the distance from the folding axis FA increases.

For example, the fourth horizontal gap D-H2 of the opening patterns OP may be same within the second link area C2, or may be gradually increased as the distance from the folding axis FA increases.

In an aspect, the vertical gaps A-V2, B-V2, C-V2 and D-V2 of the opening patterns OP may be gradually increased from the first area VA1 to the second link area C2. For example, the vertical gaps A-V2, B-V2, C-V2 and D-V2 of the opening patterns OP may be gradually increased as it goes from the folding axis FA to the non-variable area NVA1 along the horizontal direction.

For example, the density per unit area of the opening patterns OP may be gradually decreased in the direction from the first area VA1 to the second link area C2.

For example, as the distance along the horizontal direction of the non-variable area NVA1 from the folding axis FA increases, the density per unit area of the opening patterns OP may become progressively getting low.

For example, the width A-H1 of the opening patterns OP along the vertical direction to the folding axis FA may be same in all areas. The maximum value of the width A-H1 may be twice (200%) the thickness of the first plate 600. The aspects of the present disclosure are not limited thereto.

For example, the vertical gap A-V2, B-V2, C-V2 and D-V2 of the opening patterns OP may be same within each area, or may be gradually increased as the distance from the folding axis FA increases.

For example, the first vertical gap A-V2 of the opening patterns OP may be same within the first area VA1, or may be gradually increased as the distance from the folding axis FA increases.

For example, the second vertical gap B-V2 of the opening patterns OP may be same within the first link area C1, or may be gradually increased as the distance from the folding axis FA increases.

For example, the third vertical gap C-V2 of the opening patterns OP may be same within the second area VA2, or may be gradually increased as the distance from the folding axis FA increases.

For example, the fourth vertical gap D-V2 of the opening patterns OP may be same within the second link area C2, or may be gradually increased as the distance from the folding axis FA increases.

For example, the at least one opening pattern OP may have a first length A-V1 in the first area, a second length B-V1 in the first link area C1, a third length C-V1 in the second area, and a fourth length D-V1 in the second link area C2. For example, each of the lengths A-V1, B-V1, C-V1 and D-V1 of the opening patterns OP which is parallel to the folding axis FA may have same length in each of the areas, or may be gradually increased as the distance from the folding axis FA increases.

For example, the lengths A-V1, B-V1, C-V1 and D-V1 of the opening patterns OP may be the same, or become progressively smaller as it goes from the variable area VA to the non-variable area NVA1.

For example, the first length A-V1 of the opening patterns OP may be same within the first area VA1, or may be gradually decreased as the distance from the folding axis FA increases.

For example, the second length B-V1 of the opening patterns OP may be same within the first link area C1, or may be gradually decreased as the distance from the folding axis FA increases.

For example, the third length C-V1 of the opening patterns OP may be same within the second area VA2, or may be gradually decreased as the distance from the folding axis FA increases.

For example, the fourth length D-V1 of the opening patterns OP may be same within the second link area C2, or may be gradually decreased as the distance from the folding axis FA increases.

Figure 11A:
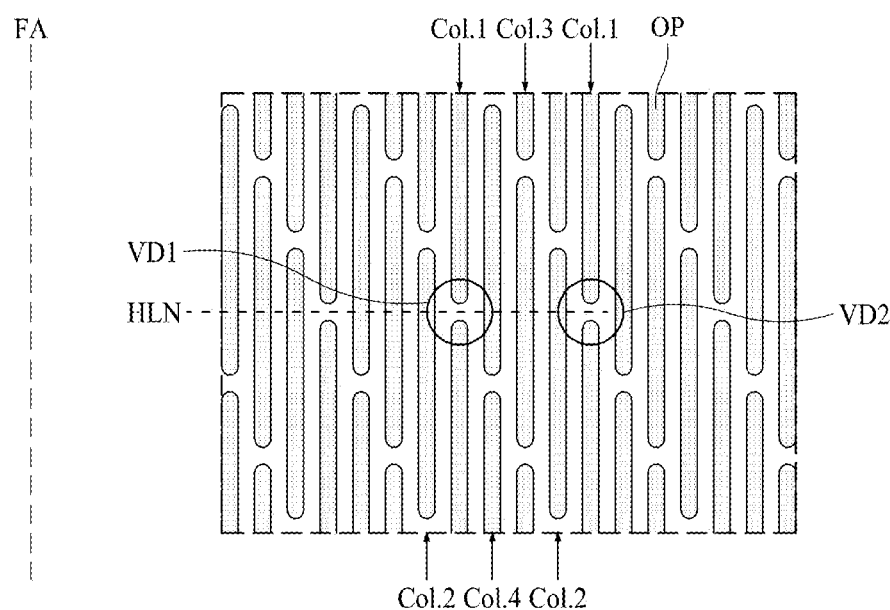
FIG. 11A is an enlarged view illustrating 'B' area of FIG. 8, according to an aspect of the present disclosure.

FIG. 11A is an enlarged view illustrating 'B' area of FIG. 8, according to another aspect of the present disclosure.

Figure 11B:
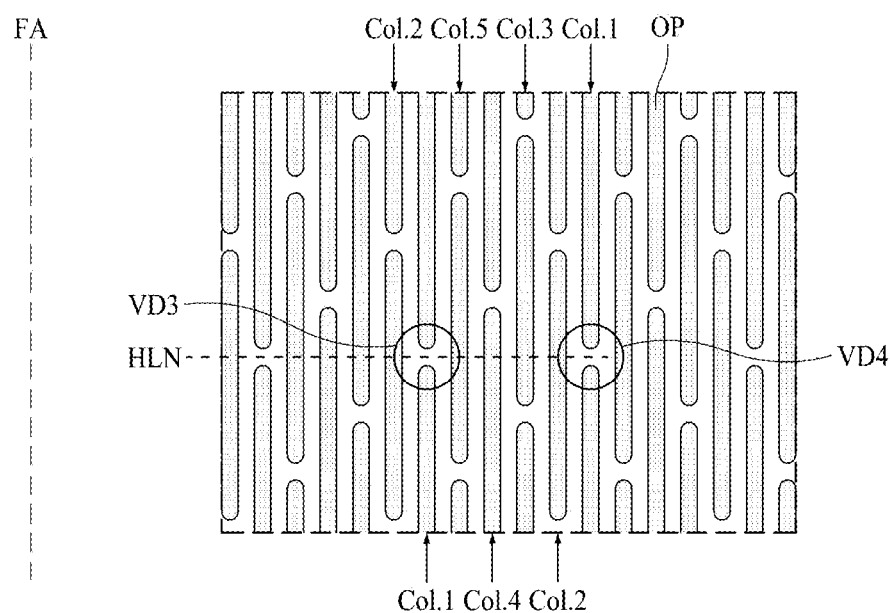
FIG. 11B is an enlarged view illustrating 'B' area of FIG. 8, according to another aspect of the present disclosure.

FIG. 11B is an enlarged view illustrating 'B' area of FIG. 8, according to another aspect of the present disclosure.

Figure 11C:
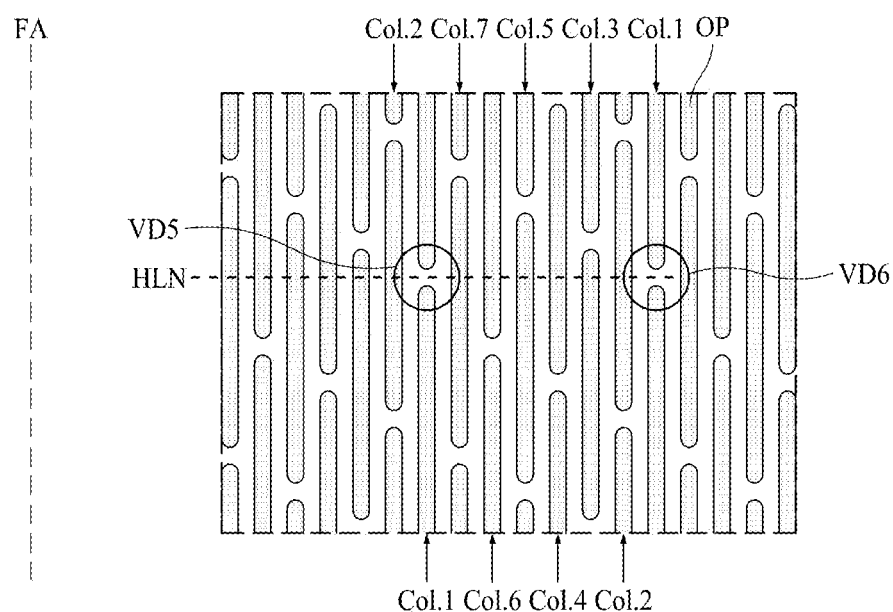
FIG. 11C is an enlarged view illustrating 'B' area of FIG. 8, according to another aspect of the present disclosure.

FIG. 11C is an enlarged view illustrating 'B' area of FIG. 8, according to another aspect of the present disclosure.

Figure 11D:
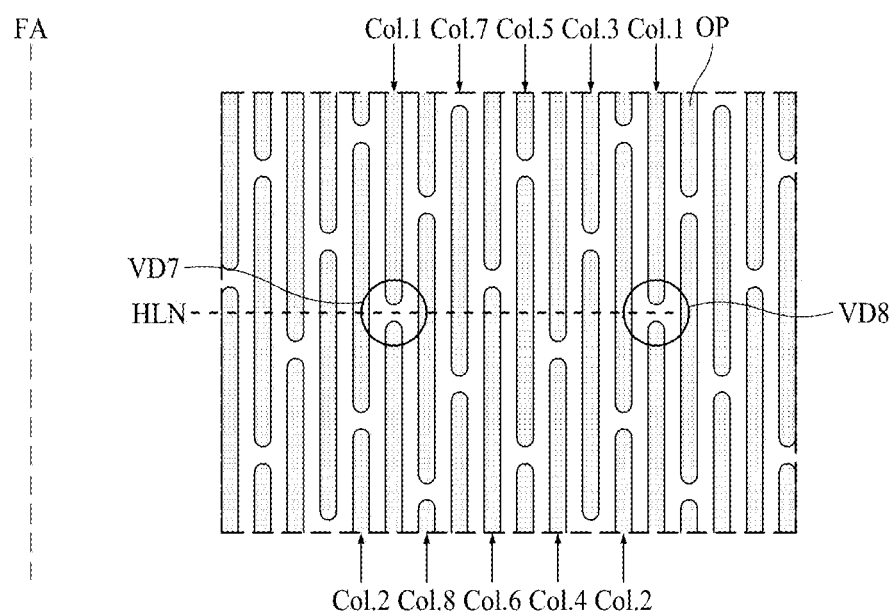
FIG. 11D is an enlarged view illustrating 'B' area of FIG. 8, according to another aspect of the present disclosure.

FIG. 11D is an enlarged view illustrating 'B' area of FIG. 8, according to another aspect of the present disclosure.

Referring to FIG. 8, and FIGS. 11A to 11D, the vertical gaps VD of the opening patterns OP may be arranged at the same horizontal position (or horizontal leveling position) for opening patterns OP in every four to eight columns along the horizontal direction. For example, as shown in FIGS. 10A to 10D, when only one column of opening patterns OP is disposed between two vertical gaps VD which are arranged in a same horizontal position, the vertical gaps VD are close to each other, so that it may be resulted in that horizontal lines are appeared perpendicular to the folding axis FA.

For example, four to eight columns of the opening patterns may be disposed between two neighboring opening pattern columns having the same formation of the opening patterns. For example, four to eight columns of the opening patterns OP having different formation of the opening patterns OP, respectively, may be disposed between two vertical gaps VD arranged at the same horizontal position along the vertical direction to the folding axis FA.

For example, when a horizontal line HLN may be drawn from a first vertical gap VD1, VD3, VD5 and VD7, a second vertical gap VD2, VD4, VD6 and VD8 may be firstly located on the horizontal line HLN which is perpendicular to the folding axis FA. Then, at least three columns of the opening patterns OP may be disposed between the first vertical gap VD1, VD3, VD5 and VD7 and the second vertical gap VD2, VD4, VD6 and VD8.

According to aspects of the present disclosure, by arranging every four or more vertical gaps VD of the opening patterns OP on the same horizontal line (or horizontal leveling line), the distance between two vertical gaps VD which are on the same horizontal location (or horizontal leveling location) may become long. As a result, it may prevent the appearance of the horizontal lines forming by the repeatedly arrangement, with a short interval, of the vertical gaps VD on the same horizontal location.

For example, the neighboring vertical gaps VD of the opening patterns OP may be arrayed along the diagonal direction.

For example, odd or even number of columns of the opening patterns OP may be arranged between two neighboring vertical gaps VD arrayed on the same horizontal line along the perpendicular direction to the folding axis. For example, each odd number of columns of the opening patterns OP or each even number of columns of the opening patterns OP may have the same arrangement formation. To ensure that the vertical gaps VD are arranged as irregularly as possible, an odd number of columns of the opening patterns OP may be arranged between two neighboring vertical gaps VD arranged on the same horizontal line, so that each even number of columns of opening patterns OP may have the same arrangement formation.

FIG. 11A is an enlarged view illustrating 'B' area of FIG. 8, according to an aspect of the present disclosure. Referring to FIG. 11A, every four columns of the opening patterns OP may have the same arrangement pattern. For example, a first column of the opening pattern OP and the fifth column of the opening pattern OP may have the same shape or formation. For example, between the first vertical gap VD1 and the second vertical gap VD2, three columns of the opening patterns OP may be disposed. Since the distance between the first vertical gap VD1 and the second vertical gap VD2 is longer than the case in which every two columns of the opening patterns OP are repeatedly arranged with the same arrangement pattern, it may be prevented the appearance of the horizontal lines formed by the repeatedly arranged vertical gaps VD along the horizontal direction.

For example, one column of the opening patterns OP may include a plurality of opening patterns OP arranged in parallel to the folding axis.

Referring FIGS. 8 to 11D, for example, a plurality of opening patterns OP may be arranged at a horizontal gap HD along a direction perpendicular to the direction of the folding axis FA, and at a vertical gap VD along a direction parallel to the folding axis FA. Further, at least three columns of the opening patterns OP may be disposed between two adjacent vertical gaps VD on the same horizontal extension line in the direction perpendicular to the folding axis FA.

FIG. 11B is an enlarged view illustrating 'B' area of FIG. 8, according to another aspect of the present disclosure. Referring to FIG. 11B, every five columns of the opening patterns OP may have the same arrangement pattern. For example, a first column of the opening pattern OP and the sixth column of the opening pattern OP may have the same shape or formation. For example, between the third vertical gap VD3 and the fourth vertical gap VD4, four columns of the opening patterns OP may be disposed. Since the distance between the third vertical gap VD3 and the fourth vertical gap VD4 is longer than the case in which every two columns of the opening patterns OP are repeatedly arranged with the same arrangement formation, it may be prevented the appearance of the horizontal lines formed by the repeatedly arranged vertical gaps VD along the horizontal direction.

FIG. 11C is an enlarged view illustrating 'B' area of FIG. 8, according to another aspect of the present disclosure. Referring to FIG. 11C, every seven columns of the opening patterns OP may have the same arrangement formation. For example, a first column of the opening pattern OP and the eight column of the opening pattern OP may have the same shape or formation. For example, between the fifth vertical gap VD5 and the sixth vertical gap VD6, six columns of the opening patterns OP may be disposed. Since the distance between the fifth vertical gap VD5 and the sixth vertical gap VD6 is longer than the case in which every two columns of the opening patterns OP are repeatedly arranged with the same arrangement formation, it may be prevented the appearance of the horizontal lines formed by the repeatedly arranged vertical gaps VD along the horizontal direction.

FIG. 11D is an enlarged view illustrating 'B' area of FIG. 8, according to another aspect of the present disclosure. Referring to FIG. 11D, every eight columns of the opening patterns OP may have the same arrangement formation. For example, a first column of the opening pattern OP and the ninth column of the opening pattern OP may have the same shape or formation. For example, between the seventh vertical gap VD7 and the eighth vertical gap VD8, seven columns of the opening patterns OP may be disposed. Since the distance between the seventh vertical gap VD7 and the eighth vertical gap VD8 is longer than the case in which every two columns of the opening patterns OP are repeatedly arranged with the same arrangement formation, it may be prevented the appearance of the horizontal lines formed by the repeatedly arranged vertical gaps VD along the horizontal direction.

According to aspects of the present disclosure, referring to FIGS. 8 to 11D, each of the opening patterns OP may have a length parallel to the folding axis FA and a width perpendicular to the folding axis FA, and may be arrayed as being apart from each other. Further, the vertical gaps VD of the opening patterns OP are arrayed along a diagonal direction.

Figure 12:
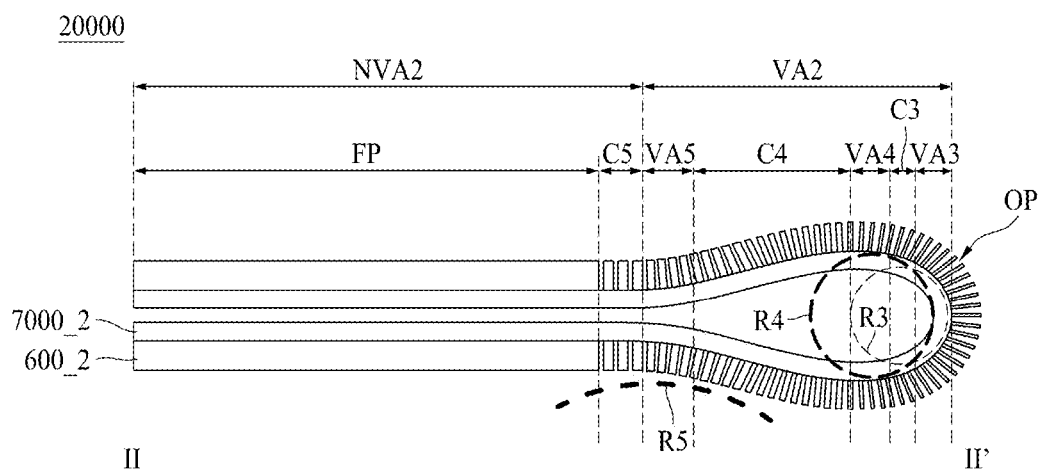
FIG. 12 is a cross-sectional view along the cutting line II-II' in FIG. 6, illustrating a display apparatus according to another aspect of the present disclosure.

FIG. 12 is a cross-sectional view along the cutting line II-II' in FIG. 6, illustrating a display apparatus according to another aspect of the present disclosure.

A display apparatus 20000 according to an aspect of the present disclosure may comprise elements from the first plate 600 to the third cover member 730 shown in FIG. 4. Otherwise, some elements may be omitted from the configuration shown in FIG. 4, or further elements may be added to the configuration shown in FIG. 4, but the aspects of the present disclosure are not limited thereto. The same configurations and their explanations referring to FIGS. 5 to 11D may be not duplicated.

The display apparatus 20000 according to an aspect of the present disclosure may comprise a plate 600_2 and a display module 7000_2 stacked on the upper surface of the plate 600_2. The display apparatus 20000 may include a variable area VA2 and a non-variable area NVA2 disposed at both sides of the variable area VA2. For example, the variable area VA2 may include a first area VA3, a second area VA4 and first link area C3 between the first area VA3 and the second area VA4. The first area VA3 may be placed at a middle portion of the plate 600_2. The second area VA4 may be located on both sides of the first area VA3 and spaced apart from the first area VA3 with a predetermined distance corresponding to the first link area C3. Further, the variable area VA2 may include a third area VA5, and a second link area C4 between the second area VA4 and the third area VA5. The third area VA5 may be spaced apart from the second area VA4 with a predetermined distance corresponding to the second link area C4. For example, the non-variable area NVA2 may include a flat area FP and a third link area C5. The flat area FP may be located at both sides of the variable area VA2. The third link area C5 may be located between the flat area FP and the third area VA5.

Referring to FIG. 12, the display apparatus 20000 may comprises at least three areas, for example, the first area VA3, the second area VA4 and the third area VA5 of which radii of curvature are different from each other. For example, the first area VA3 which may be an inner variable (or folding or bending) area may include a first radius of curvature R3. The second area VA4 which may be an inner variable area may include a second radius of curvature R4. The third area VA5 which may be an outer variable (or folding or bending) area may include a third radius of curvature R5.

For example, the third radius of curvature R5 may be larger than that of the first radius of curvature R3 and/or the second radius of curvature R4. For example, the first radius of curvature R3 and/or the second radius of curvature R4 may smaller than the third radius of curvature R5.

There may be a need to improve the visibility problem of the opening patterns at the boundary of areas where the features (e.g., curvature) of the variable (folding or bending) areas, for example, the first area VA3, the second area VA4 and the third area VA5, may be changed, while maintaining the water drop (or tear drop or rain drop) shape as shown in FIG. 12. Therefore, according to the aspects of the present disclosure, the opening patterns OP of the plate 600_2 may be arranged with different densities in the first area VA3, the first link area C3, the second area VA4, the second link area C4, the third area VA5 and the third link area C5, respectively. For example, the density per unit area of the opening patterns OP may be gradually decreased as it moves from the first area VA3 to the third link area C5.

For example, the density per unit area of the at least one opening pattern OP may be gradually decreased from the variable area VA2 to the non-variable area NVA2.

In an aspect, at least one opening pattern OP may include a plurality of opening patterns OP.

For example, the plurality of opening patterns may be arranged at a horizontal gap along a direction perpendicular to the direction of the folding axis, and at a vertical gap along a direction parallel to the folding axis. Further, at least three columns of the opening patterns may be disposed between two adjacent vertical gaps on the same horizontal extension line in the direction perpendicular to the folding axis.

For example, four to eight columns of the opening patterns may be disposed between two neighboring opening pattern columns having the same formation of the opening patterns. For example, four to eight columns of the opening patterns having different formation of the opening patterns, respectively, may be disposed between two vertical gaps VD arranged at the same horizontal position (or horizontal leveling position) along the vertical direction to the folding axis FA.

A display apparatus according to an aspect of the present disclosure may be applied to devices such as mobile devices, video phone, smart watch, watch phone, wearable apparatus, foldable apparatus, rollable apparatus, bendable apparatus, flexible apparatus, curved apparatus, sliding apparatus, variable apparatus, electronic notebook, e-book, portable multimedia player (PMP), personal digital assistant (PDA), MP3 player, mobile medical devices, desktop PC, laptop PC, netbook computer, workstation, navigation system, vehicle navigation, vehicle display, vehicle appliance, theater equipment, theater display apparatus, television set, wallpaper device, signage device, game device, notebook, monitor, camera, camcorder and home electric appliances. The display apparatus according to the present disclosure may be further applied to an organic LED (light emitting diode) lighting device or an inorganic LED lighting device.

A display apparatus according to aspects of the present disclosure may be explained as follows.

A display apparatus according to an aspect of the present disclosure may comprise at least one plate disposed under the display panel. In an aspect, the at least one plate may include a folding axis disposed at central portion of the plate, a variable area including the folding axis, and a non-variable area disposed at both sides of the variable area. The variable area may include a first area including the folding axis, a first link area disposed at both sides of the first area, a second area disposed at both sides of the first area with the first link area therebetween. The non-variable area may include a second link area extended from the second area and a third area extended from the second link area. In an aspect, at least one plate may be disposed at the variable area, and may include at least one opening pattern which may have a length parallel to a direction of the folding axis, and a width perpendicular to the direction of the folding axis. The opening patterns may be arranged with a predetermined gap.

In an aspect, the first area may have a first radius of curvature bendable to a first direction. The second area may have a second radius of curvature different from the first radius of curvature bendable to a second direction different from the first direction.

In an aspect, the second bending direction according to the second radius of curvature may be perpendicular to the first bending direction according to the first radius of curvature.

In an aspect, the at least one opening pattern may be further arrayed in the second link area.

In an aspect, at least one opening pattern may be arranged along a direction perpendicular to the folding axis with a horizontal gap, and may be arranged along a direction parallel to the folding axis with a vertical gap.

In an aspect, the horizontal gap and/or the vertical gap of the at least one opening pattern may be gradually increased as it goes from the first area to the second link area.

In an aspect, the horizontal gap and/or the vertical gap of the at least one opening pattern may have a first gap in the first area, and a second gap wider than the first gap in the first link area.

In an aspect, the horizontal gap and/or the vertical gap of the at least one opening pattern may have a third gap wider then the second gap in the second area, and a fourth gap wider than the third gap in the second link area.

In an aspect, the horizontal gap of the at least one opening pattern may have a same value over entire area of the display apparatus. The vertical gap of the at least one opening pattern may have a same value over entire area of the display apparatus.

In an aspect, the horizontal gap and/or the vertical gap of the at least one opening pattern may have a minimum value in the first area.

In an aspect, the horizontal gap and/or the vertical gap of the at least one opening pattern may have a maximum value in the second link area.

In an aspect, the vertical gaps of the at least one opening pattern arranged at every four or more of the opening pattern columns are disposed on a same horizontal line along a direction perpendicular to the folding axis.

In an aspect, three or more of the opening pattern columns are arrayed between two neighboring vertical gaps of the at least one opening pattern disposed on a same horizontal line along a direction perpendicular to the folding axis.

In an aspect, the at least one opening pattern may be arranged at every four to eight of the opening pattern columns.

In an aspect, a density of unit area of the at least one opening pattern may be decreased from the first area to the second link area.

In an aspect, at least three opening pattern columns are disposed between two neighboring opening pattern columns having a same formation.

In an aspect, a portion of the at least one plate overlapped with the variable area may have a thickness thinner than or the same as a portion of the at least one overlapped with the non-variable area.

In an aspect of the present disclosure, a display apparatus may comprise a display panel and at least one plate under the display panel. In an aspect, the at least one plate may include a folding axis defined at the plate, a variable area including the folding axis and a non-variable area disposed at both sides of the variable area. The variable area may include a first area including the folding axis, a second area spaced apart from the first area, and a third area spaced apart from the first area and the second area. The first area, the second area and the third area may include at least three radii of curvature different from each other.

In an aspect, at least one plate may include a plurality of opening patterns.

In an aspect, a unit area density of the at least one opening pattern of the first area, the second area and the third area may be different each other.

In an aspect, a plurality of opening patterns may be arranged along a direction perpendicular to the folding axis with a horizontal gap, and may be arranged along a direction parallel to the folding axis with a vertical gap. At least three opening pattern columns are disposed between two neighboring opening pattern columns having a same formation.

The features, structures, effects and so on described in the above example aspects of the present disclosure are included in at least one example aspect of the present disclosure, and are not necessarily limited to only one example aspect. Furthermore, the features, structures, effects and the like explained in at least one example aspect may be implemented in combination or modification with respect to other example aspects by those skilled in the art to which this disclosure is directed. Accordingly, such combinations and variations should be construed as being included in the scope of the present disclosure.

It will be apparent to those skilled in the art that various substitutions, modifications, and variations are possible within the scope of the present disclosure without departing from the spirit and scope of the present disclosure. Therefore, it is intended that aspects of the present disclosure cover the various substitutions, modifications, and variations of the present disclosure, provided they come within the scope of the appended claims and their equivalents. These and other changes may be made to the aspects in light of the above detailed description. In general, in the following claims, the terms used should not be construed to limit the claims to the specific example aspects disclosed in the specification and the claims, but should be construed to include all possible aspects along with the full scope of equivalents to which such claims are entitled. Accordingly, the claims are not limited by the disclosure.

What is claimed is:

1. A display apparatus comprising:
    a display panel; and
    at least one plate disposed under the display panel,
    wherein the at least one plate includes:
        a folding axis at a central portion of the plate;
        a variable area including the folding axis; and
        non-variable areas disposed at both sides of the variable area,
    wherein the variable area includes:
        a first area including the folding axis;
        first link areas disposed at both sides of the first area; and
        a second area disposed at both sides of the first area, the first link area disposed between the first area and the second area,
    wherein the non-variable areas include:
        a second link area connected to the second area; and
        a third area connected to the second link area,
    wherein the at least one plate includes at least one opening pattern being disposed in the variable area, having a length parallel to a folding axis direction and a width perpendicular to the folding axis direction, and being spaced apart with a predetermined gap.

2. The display apparatus according to claim 1, wherein the first area has a first radius of curvature configured to bend in a first direction, and
    wherein the second area has a second radius of curvature different from the first radius of curvature configured to bend in a second direction different from the first direction.

3. The display apparatus according to claim 2, wherein the second radius of curvature is larger than the first radius of curvature, and the second direction is perpendicular to the first direction.

4. The display apparatus according to claim 1, wherein the at least one opening pattern is further disposed in the second link area of the non-variable areas.

5. The display apparatus according to claim 4, wherein the at least one opening pattern is arranged with a horizontal gap along a perpendicular direction to the folding axis direction, and with a vertical gap along the folding axis direction.

6. The display apparatus according to claim 5, wherein at least one of the horizontal gap and the vertical gap gradually increases from the first area to the second link area.

7. The display apparatus according to claim 5, wherein the horizontal gap of the at least one opening pattern includes:
    a first horizontal gap in the first area; and
    a second horizontal gap wider than the first horizontal gap in the first link area.

8. The display apparatus according to claim 7, wherein the horizontal gap of the at least one opening pattern further includes:

a third horizontal gap wider than the second horizontal gap in the second area; and a fourth horizontal gap wider than the third horizontal gap in the second link area.

9. The display apparatus according to claim 5, wherein at least one of the horizontal gap and the vertical gap of the at least one opening pattern has a same value over entire areas of the plate.

10. The display apparatus according to claim 5, wherein at least one of the horizontal gap and the vertical gap of the at least one opening pattern has a minimum value in the first area.

11. The display apparatus according to claim 5, wherein at least one of the horizontal gap and the vertical gap of the at least one opening pattern has a maximum value in the second link area.

12. The display apparatus according to claim 5, wherein the vertical gaps of the at least one opening pattern arranged at every four or more of the opening pattern columns are disposed on a same horizontal line along a direction perpendicular to the folding axis.

13. The display apparatus according to claim 12, wherein three or more of the opening pattern columns are arrayed between two neighboring vertical gaps of the at least one opening pattern disposed on a same horizontal line along a direction perpendicular to the folding axis.

14. The display apparatus according to claim 13, wherein the at least one opening pattern is arranged at every four to eight of the opening pattern columns.

15. The display apparatus according to claim 5, wherein at least three opening pattern columns are arrayed between two neighboring vertical gaps of the at least one opening pattern disposed on a same horizontal line along a direction perpendicular to the folding axis.

16. The display apparatus according to claim 4, wherein a unit area density of the at least one opening pattern is gradually decreased from the first area to the second link area.

17. The display apparatus according to claim 1, wherein a portion of the at least one plate overlapped with the variable area has a thickness thinner than or the same as a portion of the at least one overlapped with the non-variable area.

18. A display apparatus comprising:
a display panel; and
at least one plate disposed under the display panel,
wherein the at least one plate includes:
 a folding axis set on the plate;
 a variable area including the folding axis; and
 two non-variable areas disposed at both sides of the variable area, respectively,
wherein the variable area includes:
 a first area including the folding axis;
 a second area spaced apart from the first area; and
 a third area spaced apart from the second area,
wherein the first area, the second area and the third area include at least three radii of curvature different from each other, and
wherein the at least one plate includes a plurality of opening patterns.

19. The display apparatus according to claim 18, wherein unit area densities of the plurality of opening patterns in the first area, in the second area and in the third area are different from each other.

20. The display apparatus according to claim 18, wherein the plurality of opening patterns are arranged at a horizontal interval along a direction perpendicular to a folding axis direction, at a vertical interval along the folding axis direction, and
wherein at least three columns of the opening patterns are arranged between two neighboring vertical gaps disposed on a same horizontal line along the direction perpendicular to the folding axis direction.

* * * * *